(12) United States Patent
Oh

(10) Patent No.: US 12,288,370 B2
(45) Date of Patent: Apr. 29, 2025

(54) WEARABLE ELECTRONIC DEVICE AND METHOD OF OPERATING THE WEARABLE ELECTRONIC DEVICE

(71) Applicant: Samsung Electronics Co., Ltd., Suwon-si (KR)

(72) Inventor: Paul Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 392 days.

(21) Appl. No.: 17/735,630

(22) Filed: May 3, 2022

(65) Prior Publication Data

US 2023/0154134 A1 May 18, 2023

(30) Foreign Application Priority Data

Nov. 18, 2021 (KR) .................... 10-2021-0159308

(51) Int. Cl.
*G06V 10/25* (2022.01)
*G06F 3/01* (2006.01)
(Continued)

(52) U.S. Cl.
CPC .............. *G06V 10/25* (2022.01); *G06F 3/017* (2013.01); *G06V 40/28* (2022.01); *H04N 13/106* (2018.05); *H04N 13/344* (2018.05)

(58) Field of Classification Search
CPC ........ G06V 10/25; G06V 40/28; G06V 20/20; G06V 40/113; G06V 10/82; G06V 40/20; G06V 40/10; G06V 40/107; G06F 3/017; G06F 2203/0381; G06F 3/011; G06F 1/163; G06F 3/005; G06F 3/04842; G06F 3/04845; G06F 3/0482; G06F 3/04815; G06F 3/012; H04N 13/106; H04N 13/344; G02B 27/017; G02B 2027/0187; G02B 2027/0138; G02B 2027/014; G02B 2027/0178; G02B 27/0172; G02B 27/0093; G02B 27/01; G06T 19/006; G06T 2207/10016; G06T 7/246;
(Continued)

(56) References Cited

U.S. PATENT DOCUMENTS 9,551,873 B2   1/2017  Zalewski
9,697,609 B2 * 7/2017  Kim ..................... G06V 40/103
(Continued)

FOREIGN PATENT DOCUMENTS

KR   101320922 B1 * 10/2013
KR   20150040580 A * 4/2015
(Continued)

*Primary Examiner* — Henok Shiferaw
*Assistant Examiner* — Woo C Rhim
(74) *Attorney, Agent, or Firm* — NSIP Law

(57) ABSTRACT

A method of operating a wearable electronic device includes: recognizing a first gesture of a hand of a user for setting a region of interest (ROI) corresponding to a view of the user in an image frame corresponding to a view of a camera; generating a virtual display for projecting the ROI based on whether the first gesture is recognized; extracting the ROI from the image frame; recognizing a second gesture of the hand for adjusting a size of the ROI; and adjusting the size of the ROI and projecting the ROI of the adjusted size onto the virtual display, based on whether the second gesture is recognized.

22 Claims, 17 Drawing Sheets

(51) Int. Cl.
*G06V 40/20* (2022.01)
*H04N 13/106* (2018.01)
*H04N 13/344* (2018.01)

(58) Field of Classification Search
CPC .. G06T 2219/2016; G06T 2207/20084; G06N 20/00; G06N 3/045; G06N 3/02; G06N 3/0464; G06N 3/084
See application file for complete search history.

(56) References Cited

U.S. PATENT DOCUMENTS

| | | | |
|---|---|---|---|
| 9,823,744 B2 | 11/2017 | Publicover et al. | |
| 10,101,803 B2 | 10/2018 | Faaborg et al. | |
| 10,635,161 B2 | 4/2020 | Clement et al. | |
| 2012/0326961 A1 | 12/2012 | Bromer | |
| 2014/0225918 A1* | 8/2014 | Mittal | G06T 19/006 |
| | | | 345/633 |
| 2015/0035820 A1* | 2/2015 | Le | G06T 17/00 |
| | | | 345/419 |
| 2016/0117860 A1 | 4/2016 | Fei et al. | |
| 2016/0162082 A1* | 6/2016 | Schwesinger | G06F 3/013 |
| | | | 345/173 |
| 2017/0147081 A1* | 5/2017 | Kwon | G06T 7/20 |
| 2017/0347084 A1* | 11/2017 | Boyce | H04N 19/33 |
| 2018/0158250 A1 | 6/2018 | Yamamoto et al. | |
| 2019/0025909 A1* | 1/2019 | Mittal | G06F 3/011 |
| 2019/0058859 A1* | 2/2019 | Price | H04N 13/271 |
| 2019/0065027 A1 | 2/2019 | Hauenstein et al. | |
| 2019/0212827 A1* | 7/2019 | Kin | G02B 27/0172 |
| 2019/0362557 A1* | 11/2019 | Lacey | G06F 3/012 |
| 2019/0384405 A1* | 12/2019 | Iyer | G06V 40/113 |
| 2020/0184721 A1* | 6/2020 | Ge | G06N 3/045 |
| 2020/0241634 A1* | 7/2020 | Iyer | H04N 19/17 |
| 2020/0279104 A1* | 9/2020 | Andersen | A63F 13/25 |
| 2020/0320793 A1* | 10/2020 | Marcolina | G06V 20/20 |
| 2021/0124917 A1* | 4/2021 | Wang | G06T 17/00 |
| 2021/0181842 A1* | 6/2021 | Kuji | A63F 13/26 |
| 2021/0248766 A1* | 8/2021 | Koo | G02B 27/017 |
| 2021/0263593 A1* | 8/2021 | Lacey | G06V 40/107 |
| 2021/0373672 A1* | 12/2021 | Schwarz | G06F 3/017 |
| 2022/0171469 A1* | 6/2022 | Schwarz | G06F 3/011 |
| 2022/0326781 A1* | 10/2022 | Hwang | G06T 7/70 |
| 2023/0147019 A1* | 5/2023 | Berliner | G06F 3/012 |
| | | | 345/157 |
| 2023/0214458 A1* | 7/2023 | Marsden | G06V 40/11 |
| | | | 382/157 |
| 2023/0418432 A1* | 12/2023 | Faulkner | G06F 3/0304 |

FOREIGN PATENT DOCUMENTS

| | | |
|---|---|---|
| KR | 10-2015-0140043 A | 12/2015 |
| KR | 10-2017-0026164 A | 3/2017 |
| WO | WO-2022050668 A1 * | 3/2022 |

* cited by examiner

WEARABLE ELECTRONIC DEVICE AND METHOD OF OPERATING THE WEARABLE ELECTRONIC DEVICE

CROSS-REFERENCE TO RELATED APPLICATIONS

This application claims the benefit under 35 USC § 119(a) of Korean Patent Application No. 10-2021-0159308, filed on Nov. 18, 2021 in the Korean Intellectual Property Office, the entire disclosure of which is incorporated herein by reference for all purposes.

BACKGROUND

1. Field

The following description relates to a wearable electronic device and a method of operating the wearable electronic device.

2. Description of Related Art

Electronic devices implementing virtual reality (VR), augmented reality (AR), or mixed reality (MR) may combine virtual objects or information with a real-world environment and provide them to be used in various ways in environments, for example, a ubiquitous environment or an Internet of things (IoT) environment. The electronic devices may combine an external foreground and a virtual image to deliver a variety of information to a user in a more realistic way.

Although the electronic devices may identify an intention of a user or interact with the user based on a result of eye and/or gaze tracking, it may not accurately identify an actual intention of a user and deliver various intentions of the user based solely on the result of the eye and/or gaze tracking.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of operating a wearable electronic device includes: recognizing a first gesture of a hand of a user for setting a region of interest (ROI) corresponding to a view of the user in an image frame corresponding to a view of a camera; generating a virtual display for projecting the ROI based on whether the first gesture is recognized; extracting the ROI from the image frame; recognizing a second gesture of the hand for adjusting a size of the ROI; and adjusting the size of the ROI and projecting the ROI of the adjusted size onto the virtual display, based on whether the second gesture is recognized.

The extracting the ROI may include: determining positions of hand joints of the user in the image frame; and extracting the ROI based on the determined positions of the hand joints.

The determining the positions of the hand joints may include determining the positions of the hand joints of the user from the image frame for each type of the first gesture.

The extracting the ROI may include setting the ROI using the positions of the hand joints determined for each type of the first gesture.

The determining the positions of the hand joints may include: determining a rotation angle of the hand based on a regression between the positions of the hand joints; and determining new positions of the hand joints by adjusting the determined rotation angle of the hand, and the extracting the ROI may include extracting the ROI based on the new positions of the hand joints.

The extracting the ROI may include: determining a center point of the ROI and a length of each side of the ROI based on a weighted sum between the determined positions of the hand joints; and extracting the ROI based on the center point of the ROI and the length of each side of the ROI.

The extracting the ROI may include: determining a hand pose of the user using a pre-trained neural network; determining positions of hand joints of the user from the determined hand pose; and determining a central position of the ROI and a length of each side of the ROI from the determined positions of the hand joints.

The virtual display may be displayed based on whether either one of the first gesture and the second gesture is maintained.

The generating the virtual display may include generating the virtual display irrespective of a position of the view of the camera.

The recognizing the first gesture may include, in response to the first gesture not being recognized in the image frame, recognizing the first gesture in a previous image frame of the image frame.

The projecting onto the virtual display may include: in response to the second gesture being recognized, enlarging a central portion of the ROI by a fixed scale factor; and projecting the enlarged central portion onto the virtual display.

The projecting onto the virtual display may include: adjusting the size of the ROI by a variable ratio that is based on a first distance between index fingers of both hands of the user in the first gesture and a second distance between the index fingers of the hands in the second gesture; and projecting the ROI of the adjusted size onto the virtual display.

The method may include, in response to the second gesture not being recognized, projecting the ROI without the adjusted size onto the virtual display.

The wearable electronic device may include any one or any combination of any two or more of smart glasses, virtual reality (VR) glasses, a head-mounted display (HMD), an eye-mounted display (EMD), an augmented reality (AR) device, a VR device, and a mixed reality (MR) device.

In another general aspect, one or more embodiments include a non-transitory computer-readable storage medium storing instructions that, when executed by one or more processors, configure the one or more processors to perform any one, any combination, or all operations and methods described herein.

In another general aspect, a wearable electronic device includes: a camera configured to obtain an image frame; and one or more processors configured to: recognize a first gesture of a hand of a user for setting a region of interest (ROI) corresponding to a view of the user in the image frame corresponding to a view of the camera, generate a virtual display for projecting the ROI based on whether the first gesture is recognized, extract the ROI from the image frame, recognize a second gesture of the hand for adjusting a size of the ROI, and adjust the size of the ROI based on whether the second gesture is recognized and project the ROI of the adjusted size onto the virtual display.

For the extracting the ROI, the one or more processors may be configured to: determine positions of hand joints of the user in the image frame, and extract the ROI based on the determined positions of the hand joints.

The one or more processors may be configured to: for the determining the positions of the hand joints, determine the positions of the hand joints of the user from the image frame for each type of the first gesture, and for the extracting the ROI, set the ROI using the positions of the hand joints determined for each type of the first gesture.

The one or more processors may be configured to: for the determining the positions of the hand joints, determine a rotation angle of the hand based on a regression between the positions of the hand joints, and determine new positions of the hand joints by adjusting the determined rotation angle of the hand, and for the extracting the ROI, extract the ROI based on the new positions of the hand joints.

For the extracting the ROI, the one or more processors may be configured to: determine a center point of the ROI and a length of each side of the ROI based on a weighted sum between the determined positions of the hand joints, and extract the ROI based on the center point of the ROI and the length of each side of the ROI.

In another general aspect, a method of operating a wearable electronic device includes: recognizing a first gesture of a hand of a user in an image frame corresponding to a view of a camera; extracting, from the image frame, a region of interest (ROI) corresponding to the first gesture; and adjusting a size of the extracted ROI and projecting the ROI of the adjusted size onto a virtual display, based on whether a second gesture of the hand is recognized.

The recognizing the second gesture may include recognizing a change in space between fingers of the user while a pose of the fingers corresponding to the first gesture is maintained.

The extracting the ROI may include: determining a weighted sum between positions of hand joints of the user in the image frame, based on a determined type of the first gesture; and determining a position and size of the ROI based on the weighted sum.

The extracting the ROI may include determining a length of the ROI to be between positions of hand joints of the user in the image frame and a width of the ROI to be between positions of other hand joints of the user in the image frame.

Other features and aspects will be apparent from the following detailed description, the drawings, and the claims.

Figure 1:
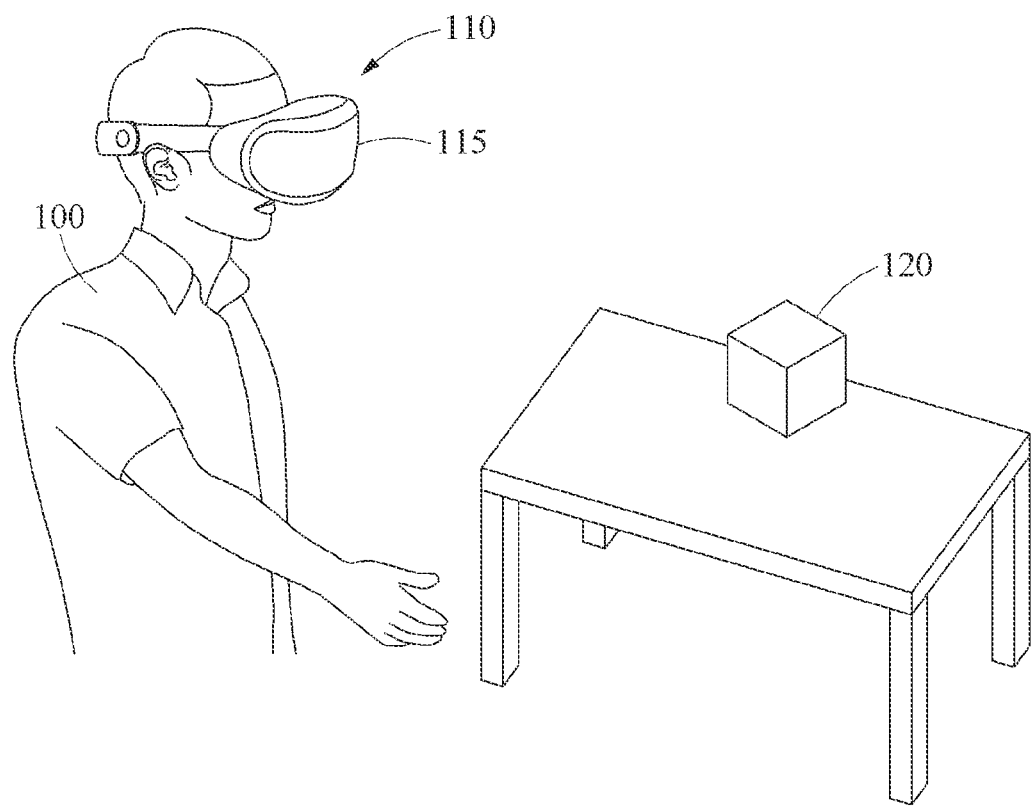
FIGS. 1 and 2 illustrate an overview of a wearable electronic device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "comprises," "includes," and "has" specify the presence of stated integers, steps, features, numbers, operations, members, elements, and/or combinations thereof, but do not preclude the presence or addition of one or more other integers, steps, features, numbers, operations, members, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Throughout the specification, when an element, such as a layer, region, or substrate, is described as being "on," "connected to," or "coupled to" the other element, it may be directly "on," "connected to," or "coupled to" the other component, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

Figure 2:
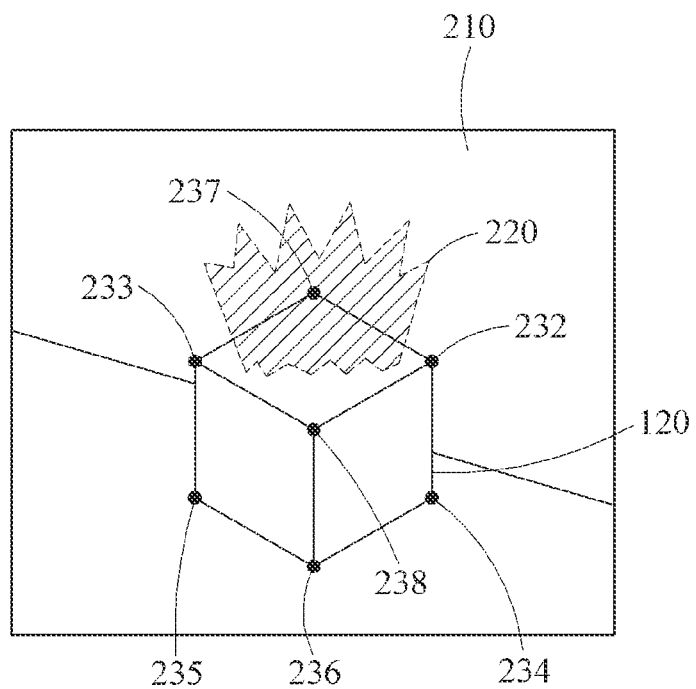

FIGS. 1 and 2 illustrate an overview of a wearable electronic device.

Referring to FIG. 1, a wearable electronic device 110 of an example embodiment may provide any one or any combination of any two or more of a virtual reality (VR) service, an augmented reality (AR) service, and a mixed reality (MR) service to a user 100. The AR service may superimpose a virtual image or virtual content on an image of a real world viewed by the user 100. The wearable electronic device 110 may generate and provide a virtual image (e.g., a virtual object 220 of FIG. 2) including a content associated with a real object 120 in the real world together with the real object 120 in the real world to the user 100 through a display 115. In this case, the virtual image may be displayed on a virtual display that is realized or displayed through the display 115.

The virtual image provided to the user 100 may be a two-dimensional (2D) image or three-dimensional (3D) image. In addition, the virtual image may be a static image without a movement or a dynamic image having a movement such as an animation. The wearable electronic device 110 may be worn on the user 100. The wearable electronic device 110 may be an electronic device (for example, a head-mounted display (HMD), an eye-mounted display (EMD), and a face-mounted display (FMD), which includes smart glasses, a VR headset, and/or an AR headset), but is not necessarily limited thereto.

Referring to FIG. 2, a content 210 may be provided through the display 115 of the wearable electronic device 110. Hereinafter, a virtual content provided by the wearable electronic device 110 will be described as an image content 210 for AR for convenience of description. However, this may not exclude other examples, and a content for VR and/or MR may also be provided.

The wearable electronic device 110 may form the image content 210 by matching a virtual object 220 including virtual information to the real object 120 in the real world viewed by the user 100. To match the virtual object 220 to the real object 120, the wearable electronic device 110 may extract feature points 232, 233, 234, 235, 236, 237, and 238 of the real object 120 from image information obtained by capturing the real object 120. The image content 210 may be formed by, for example, reproducing a realistic virtual object from the real object 120 in the real world and/or by implementing a virtual computer graphics effect on the real object 120 in the real world. The virtual computer graphics effect may be, for example, implementing, as a virtual image, additional information such as a user manual or an additional content such as a virtual character explaining the user manual on a real mechanical device, or implementing, as a virtual image, a content processed by enlarging and/or reducing a region of interest (ROI) viewed by a user, but is not limited thereto.

For example, when the user 100 moves a head or gaze of the user 100, a gaze direction in which the user 100 views the real object 120 may be changed. The wearable electronic device 110 may provide the user 100 with the image content 210 that becomes highly precise by finely adjusting the virtual object 220 based on the changed gaze direction. The wearable electronic device 110 may naturally match the real object 120 and the virtual object 220 by precisely measuring the change in the gaze direction. The wearable electronic device 110 may implement the image content 210 that is realistic by representing the virtual object 220 at an accurate position in association with the real object 120 in a scene in which the user 100 views the real object 120.

The wearable electronic device 110 may perform itself hand pose estimation, non-limiting examples of which will be described later, or may receive information on an estimated hand pose through a pose estimating device. In a non-limiting example, the pose estimating device may be separate and/or external to the wearable electronic device 110, and in another non-limiting example, the pose estimating device may be included in the wearable electronic device 110. In this case, the pose estimating device may perform localization of the wearable electronic device 110. A result of the localization may be used to estimate a movement of the head of the user 100, a viewing direction of the user 100, and/or a hand pose of the user 100.

The hand pose estimated by the pose estimating device may include coordinate information on a position and orientation of a hand. The hand pose may be represented by, for example, six degrees of freedom (6 DOF), but is not necessarily limited thereto.

In addition, a pose of the wearable electronic device 110 estimated by the pose estimating device may correspond to a pose of the user 100 wearing the wearable electronic device 110 and/or a pose of an image sensor (e.g., a camera) included in the wearable electronic device 110.

For example, the pose estimating device may determine a pose of the wearable electronic device 110 and/or a pose of at least a body part (e.g., the hand) of the user 100, using image information obtained by the camera or the image sensor and motion information obtained by a motion sensor (e.g., data from an inertial sensor). The pose estimating device may accurately and effectively estimate the pose of the wearable electronic device 110 and/or the pose of the body part of the user 100 by using both the image information and the motion information. The image sensor (e.g., the camera) and the motion sensor may be included in the wearable electronic device 110. The image sensor may obtain the image information by capturing an image of at least a portion (e.g., a region in front of the user 100) among portions or regions around the wearable electronic device 110. The motion sensor may measure a movement of the wearable electronic device 110 or the user 100. The motion sensor may include, as non-limiting examples, an inertial measurement unit (IMU) including an acceleration sensor and a gyro sensor.

The pose estimating device may estimate positions of objects in an image by applying a change in the movement of the wearable electronic device 110 from a position of the wearable electronic device 110 at a previous time to a position of the wearable electronic device 110 at a current time.

Figure 3:
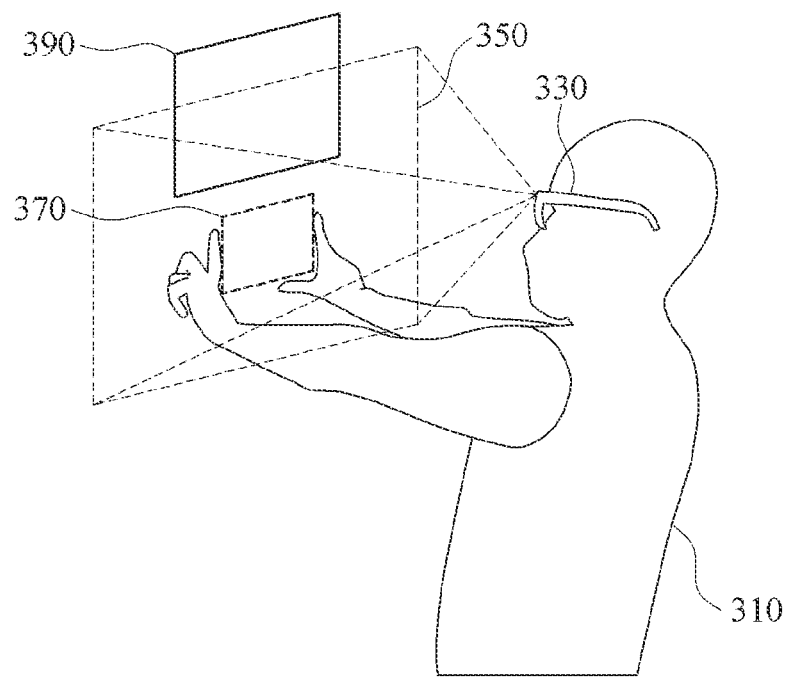
FIG. 3 illustrates an overview of an operation of a wearable electronic device.
Figure 3:
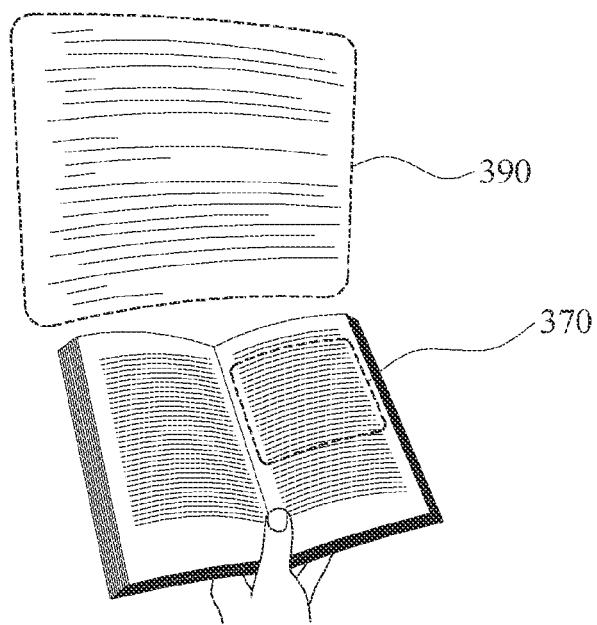

FIG. 3 illustrates an overview of an operation of a wearable electronic device. Referring to FIG. 3, when a user 310 wearing a wearable electronic device 330 performs a first gesture using both hands, an image frame 350 corresponding to a view (e.g., a field of view (FOV)) of a camera installed on a front surface of the wearable electronic device 330, an ROI 370 corresponding to a view of the user 310, and a virtual display 390 onto which an ROI is projected may be determined.

In an environment where images having a resolution enhanced compared to a human vision are obtainable in real time due to the development of a camera-related technology, the wearable electronic device 330 provided in the form of an HMD, an EMD, and/or eyeglasses may display a screen through a lens-type display in front of eyes of the user 310. The wearable electronic device 330 may dispose the virtual display 390 at a position on which the eyes of the user 310 wearing the wearable electronic device 330 may focus easily, and project, onto the virtual display 390, a region that the user 310 views with interest, or the ROI 370, without a change or by enlarging the region, using an image captured by a front camera. The wearable electronic device 330 may thereby provide a visual information processing ability beyond an original vision of the user 310.

The virtual display 390 may correspond to a (virtual) screen displayed by a display device of the wearable electronic device 330. For example, the wearable electronic device 330 may project a rectangular flat screen onto a binocular image, respectively, by assigning a desirable disparity, for example, a difference in viewpoint between both eyes, such that the screen appears to be disposed at a position (e.g., 1 meter (m)) by which the user 310 may feel comfortable. The wearable electronic device 330 may project a captured image or an enlarged image onto the rectangular flat screen such that the user 310 feels as if he or she is viewing the image from a virtual screen 1 m before the eyes of the user 310. The wearable electronic device 330 may include, for example, one or more front cameras, and may assist the user 310 with his or her vision by recognizing a specific hand gesture through a computer vision technology and projecting the ROI 370 of the user 310 onto the virtual display 390.

For example, as illustrated in FIG. 3, the user 310 may make a gesture (e.g., a first gesture) of forming a rectangular shape with both hands before the eyes. In this example, the gesture may be an intuitive gesture by which a user's intention is easily identifiable, such as, for example, a gesture indicating a rectangular shape or a gesture indicating a shape of a camera frame.

The wearable electronic device 330 may set and extract the ROI 370 assigned by the gesture of the hand in the image frame 350 obtained by the front camera. Subsequently, when a gesture (e.g., a second gesture) of expanding the ROI 370 is recognized, the wearable electronic device 330 may enlarge the extracted ROI 370 and project the enlarged ROI 370 onto the virtual display 390 to provide both the enlarged ROI 370 and the image captured by the camera to the user 310.

In an example, by recognizing a gesture that intuitively indicates a rectangular shape and/or a gesture that enlarges it, the wearable electronic device 330 may rapidly set, extract, and/or enlarge the ROI 370 without an input device such as a mouse or controller, and project it onto the virtual display 390, thereby improving an ease of use and a virtual integration of the wearable electronic device 330 by the user.

The wearable electronic device 330 may include, for example, any one or any combination of any two or more of smart glasses (including VR glasses), an HMD, an EMD, a face-mounted display (FMD), an AR device, a VR device, and an MR device.

The wearable electronic device 330 may provide desired information to the user 310 through a display provided in the form of a monocular or binoculars. The wearable electronic device 330 may obtain, in real time, an image or image data of a surrounding environment by using a camera provided to capture an image of an area in front of the wearable electronic device 330. The wearable electronic device 330 may support a wireless communication technology (such as, for example, Bluetooth and Wi-Fi) and may search for and share information in real time through an Internet connection. In addition, the wearable electronic device 330 may provide a position tracking function through a global positioning system (GPS) to execute various position information-based applications (apps). The wearable electronic device 330 may use, as an interface for communicating with the user 310, a touch button, voice recognition-based natural language command processing, and/or a user's gesture captured by a provided camera, but examples are not limited thereto.

Figure 4:
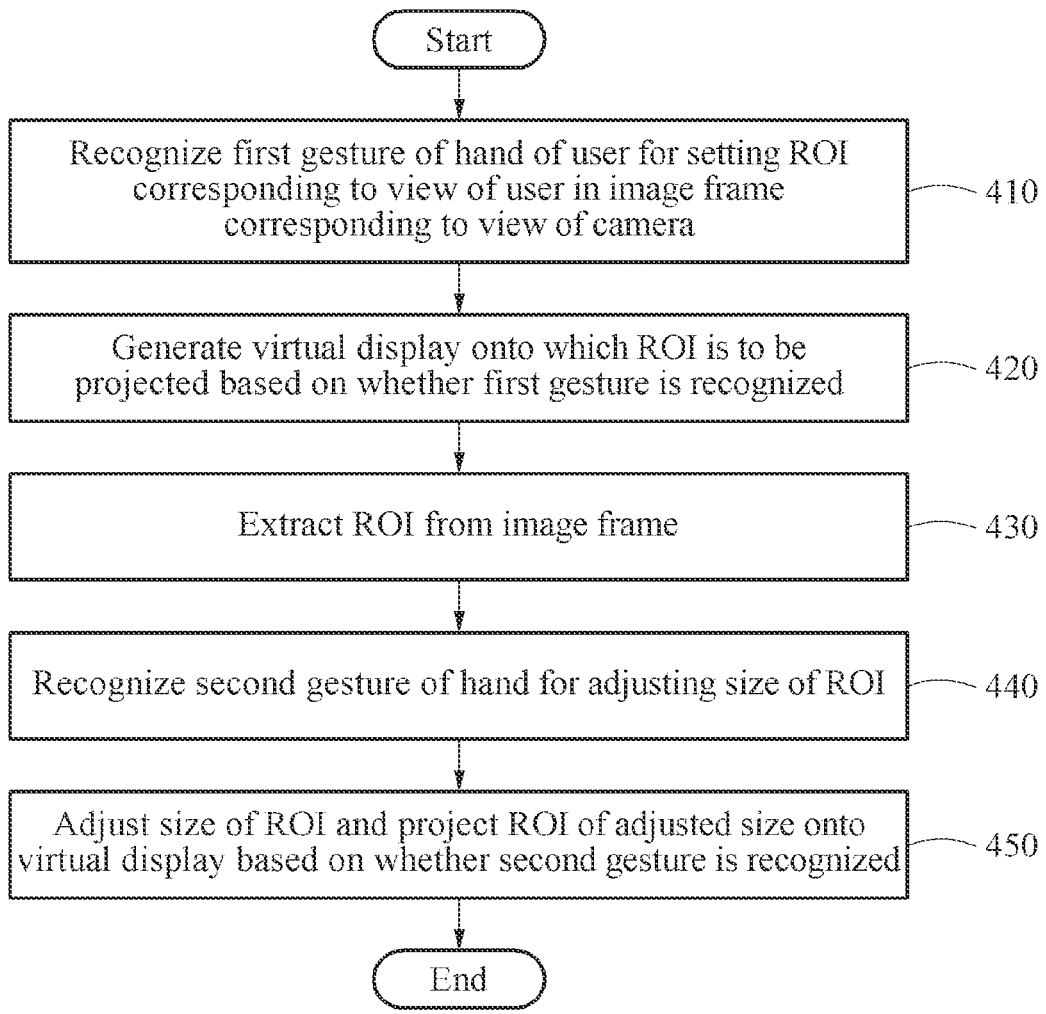
FIG. 4 illustrates an example of a method of operating a wearable electronic device.

FIG. 4 illustrates an example of a method of operating a wearable electronic device. Operations to be described hereinafter with reference to FIG. 4 may be performed in sequential order, but are not necessarily performed in sequential order. For example, the operations may be performed in different orders, and at least two of the operations may be performed in parallel.

Referring to FIG. 4, a wearable electronic device of an example embodiment may adjust the size of an ROI and project the ROI of the adjusted size onto a virtual display through operations 410 through 450 described hereinafter.

In operation 410, the wearable electronic device may recognize a first gesture of a hand of a user for setting an ROI corresponding to a view of the user in an image frame corresponding to a view of a camera. The first gesture may be a gesture of various preset types that intuitively indicates a user's intension of setting an ROI, such as, for example, a gesture indicating a rectangular shape or a gesture indicating a form of a camera frame, but examples of which are not limited thereto (e.g., a gesture corresponding to any preset gesture such as any preset hand shape and/or hand motion). For example, the wearable electronic device may recognize the first gesture based on whether the first gesture indicates a quadrangular shape or a shape close to the quadrangular shape. Also, even when the hand taking the first gesture in response to a tilted image has a tilt angle, the wearable electronic device may recognize the first gesture by a tilted quadrangular shape.

For example, when the first gesture is not recognized in the image frame, the wearable electronic device may recognize the first gesture in a previous image frame that precedes the image frame.

In operation 420, the wearable electronic device may generate a virtual display for projecting the ROI based on whether the first gesture is recognized in operation 410. The wearable electronic device may generate the virtual display regardless of a position of the view of the camera. The virtual display may be displayed based on whether either one or both of the first gesture and a second gesture is maintained. For example, the virtual display may be displayed on a screen while either one or both of the first gesture and the second gesture is maintained, and the virtual display may not be displayed on the screen when either one or both of the first gesture and the second gesture disappears. Various non-limiting examples of the first gesture and the second gesture will be described in detail with reference to FIG. 5.

In operation 430, the wearable electronic device may extract the ROI from the image frame. For example, the wearable electronic device may estimate positions of hand joints of the user from the image frame, and extract the ROI based on the estimated positions of the hand joints. In this example, the positions of the hand joints may be, for example, two-dimensional (2D) positions or three-dimensional (3D) positions.

Figure 5:
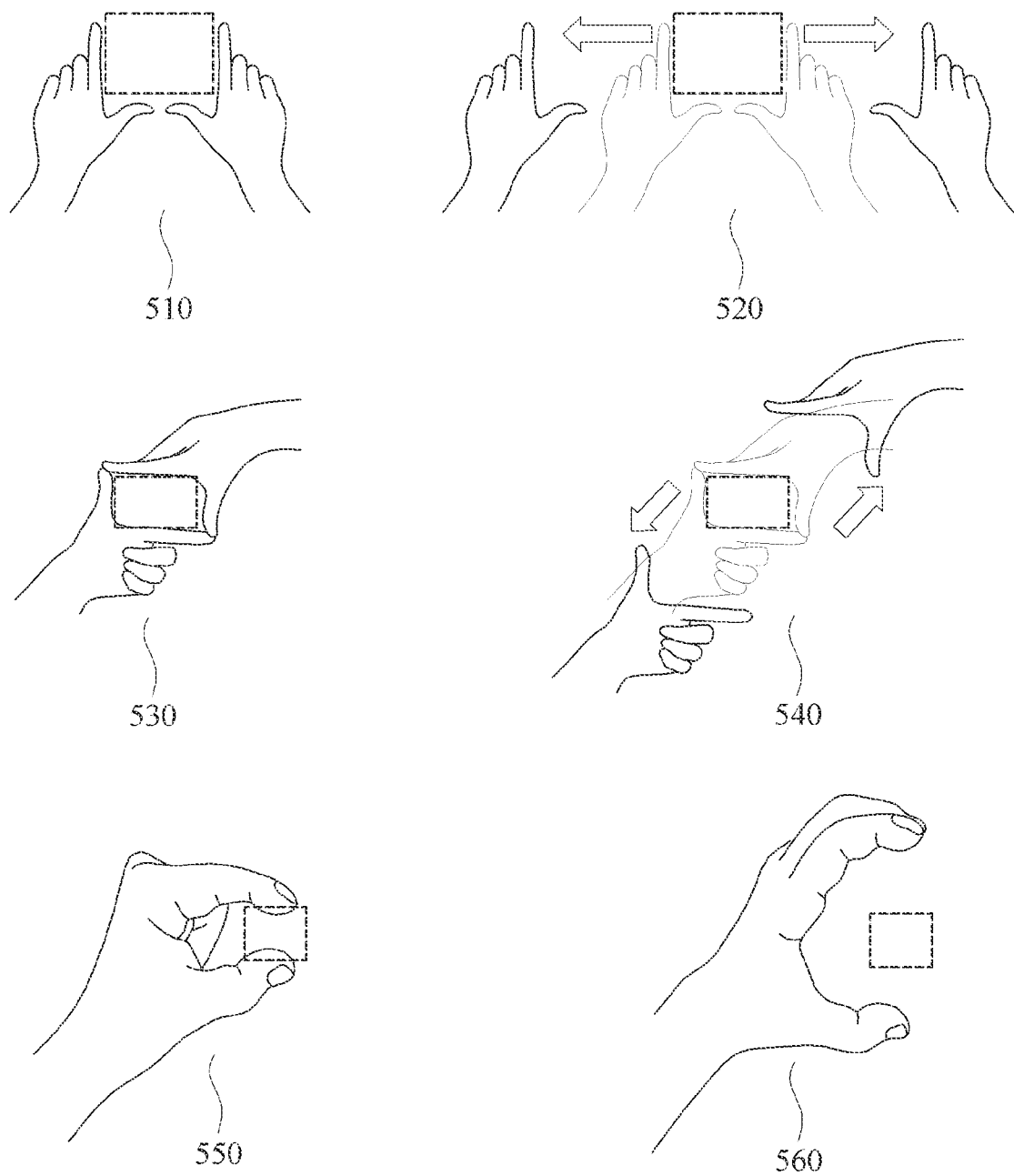
FIG. 5 illustrates examples of a first gesture and a second gesture.

For example, the wearable electronic device may estimate positions of the hand joints of the user from the image frame for each type of the first gesture. As illustrated in FIG. 5, a shape that may be made by both hands or one hand of the user may be predetermined for each type of a gesture (e.g., the first gesture). The wearable electronic device may estimate the positions of the hand joints of the user from the image frame based on an approximate shape of the first gesture taken for each type as described above.

The wearable electronic device may set and extract the ROI from the image frame using the positions of the hand joints estimated for each type of the first gesture. For example, the wearable electronic device may calculate a center point of the ROI and a length of each side of the ROI based on a weighted sum between the estimated positions of the hand joints. The wearable electronic device may set a position of the ROI based on a position of the center point of the ROI and the length of each side of the ROI, and extract the ROI from the position. The extracting of the ROI may be construed as encompassing both reproducing an image of a region corresponding to the ROI in the image frame and extracting image information of the region corresponding to the ROI. Hereinafter, a non-limiting example of extracting an ROI by the wearable electronic device will be described in detail with reference to FIG. 6.

For example, the wearable electronic device may estimate a rotation angle of the hand based on a regression between the positions of the hand joints. The wearable electronic device may calculate new positions of the hand joints by adjusting (e.g., reversely rotating) the estimated rotation angle. In this example, the wearable electronic device may extract the ROI based on the new positions of the hand joints. The wearable electronic device may extract the ROI using a weighted sum of the new positions of the hand joints. According to examples, the wearable electronic device may calculate the rotation angle of the hand using the positions of the hand joints.

Hereinafter, a non-limiting example of estimating a rotation angle of a hand by the wearable electronic device will be described with reference to FIG. 7, and non-limiting examples of calculating the rotation angle of the hand will be described with reference to FIGS. 8 and 9.

In another example, the wearable electronic device may extract the ROI using a pre-trained neural network. Hereinafter, a non-limiting example of extracting an ROI by the wearable electronic device using the neural network will be described with reference to FIG. 10.

In operation 440, the wearable electronic device may recognize a second gesture of the hand for adjusting the size of the ROI extracted in operation 430. The second gesture may be, for example, a gesture that expands the shape made by the first gesture, but is not limited thereto (e.g., the second gesture may be a gesture that contracts the shape made by the first gesture).

When the second gesture is not recognized, the wearable electronic device may project the ROI extracted in operation 430 to the virtual display as it is without adjusting the size of the ROI.

In operation 450, the wearable electronic device may adjust the size of the ROI and project the ROI of the adjusted size onto the virtual display based on whether the second gesture is recognized in operation 440. When the second gesture is recognized, the wearable electronic device may enlarge the ROI and project the enlarged ROI onto the virtual display. In this case, a focal length may be determined based on a position (of the virtual display) set by the user. When the second gesture is recognized, the wearable electronic device may enlarge a central portion in the ROI by a fixed scale factor, and project the enlarged central portion onto the virtual display.

In another example, the wearable electronic device may adjust (e.g., enlarge) the size of the ROI by a variable ratio and project the ROI of the adjusted size onto the virtual display. Hereinafter, a non-limiting example of adjusting the size of an ROI by a variable ratio by the wearable electronic device will be described in detail with reference to FIG. 11.

FIG. 5 illustrates examples of a first gesture and a second gesture. Referring to FIG. 5, illustrated are examples 510, 530, and 550 of a first gesture and respectively corresponding examples 520, 540, and 560 of a second gesture.

A gesture of a first type among the example gestures illustrated in FIG. 5 may be, for example, a gesture indicating a quadrangular shape with thumbs of both hands facing each other and index fingers raising upright, as in the examples 510 and 520. A gesture of a second type may be, for example, a gesture indicating a quadrangular shape with a thumb of a left hand and an index finger of a right hand facing each other and with an index finger of the left hand and a thumb of the right hand facing each other, as in the examples 530 and 540. A gesture of a third type may be, for example, a gesture indicating a quadrangular shape with a thumb and an index finger of one hand (e.g., a left or right hand) spreading by a distance, as in the examples 550 and 560. In each type, the second gesture may be larger than the first gesture in terms of motion size.

According to non-limiting examples, the wearable electronic device may reduce the size of an ROI by the second gesture. In this case, the size of the quadrangular shape indicated by the second gesture may be smaller than the size of the quadrangular shape indicated by the first gesture.

Figure 6:
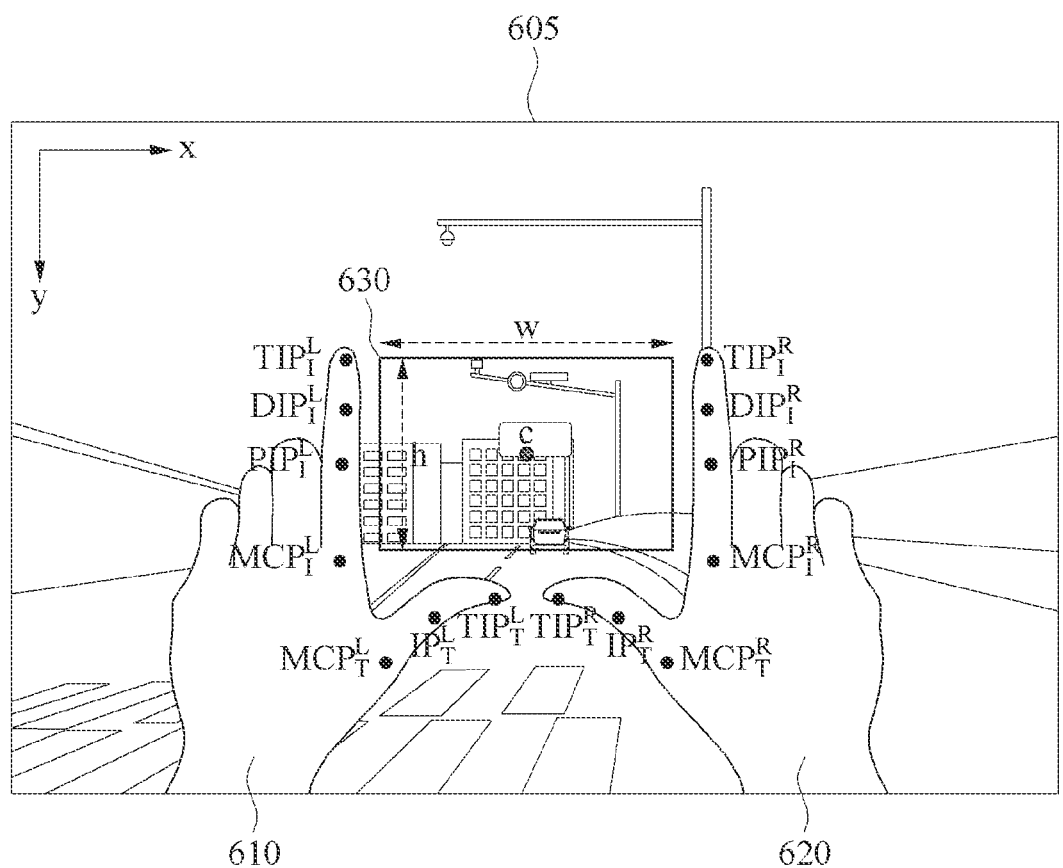
FIG. 6 illustrates an example of extracting a region of interest (ROI).

FIG. 6 illustrates an example of extracting an ROI. Referring to FIG. 6, illustrated is an image frame 605 captured by a front camera of a wearable electronic device, which includes position information of three joints $TIP_T$, $IP_T$, and $MCP_T$ of a thumb and four joints $TIP_I$, $DIP_I$, $PIP_I$, and $MCP_I$ of an index finger of each of a left hand L 610 and a right hand R 620 making a first gesture of a first type and includes position information (w, h, c) of an ROI 630.

The wearable electronic device may extract the ROI 630 defined by the first gesture made by the left hand L 610 and the right hand R 620 from the image frame 605 captured by the front camera. For example, the ROI 630 may be extracted in a rectangular shape by the first gesture.

The wearable electronic device may estimate positions of both hand joints ($TIP_I^L, TIP_I^R$, $DIP_I^L, DIP_I^R, PIP_I^L, PIP_I^R$, $MCP_I^L, MCP_I^R, TIP_T^L, TIP_T^R$, $IP_T^L$, $IP_T^R, MCP_T^L, MCP_T^R$), and calculate a position of a center point c of the ROI 630 and a length (e.g., width (w) and height (h)) of each side of the ROI 630 based on a weighted sum of the estimated positions.

The position and the length of each side of the ROI 630 may be obtained by calculating a weighted sum for positions of the joints $TIP_T$, $IP_T$, and $MCP_T$ of the thumb and positions of the joints $TIP_I$, $DIP_I$, $PIP_I$, and $MCP_I$ of the index finger that are used for recognizing the first gesture, as represented below.

The wearable electronic device may calculate the position of the center point c of the ROI 630, for example, c=(c(x), c(y)), as represented by Equation 1 below, for example.

$$c(x) = \sum_{v \in S} w_{v,x} \times v(x), \quad c(y) = \sum_{v \in S} w_{v,y} \times v(y) \qquad \text{Equation 1}$$

In Equation 1, a set S of hand joints may be represented as $S=\{TIP_I^L, TIP_I^R, DIP_I^L, DIP_I^R, PIP_I^L, PIP_I^R, MCP_I^L, MCP_I^R, TIP_T^L, TIP_T^R, IP_T^L, IP_T^R, MCP_T^L, MCP_T^R\}$. v(x) denotes an x-axis position coordinate of a vertex v corresponding to the center point c of the ROI 630, and v(y) denotes a y-axis position coordinate of the vertex v.

An x-axis weight $w_{v,x}$ may be $$w_{v,x} = \frac{1}{14}, v \in S,$$

and a y-axis weight $w_{v,y}$ may be $$w_{v,y} = \begin{cases} 0 & \text{if } v \in \{IP_T^L, IP_T^R, MCP_I^L, MCP_I^R\} \\ 0.1 & \text{else} \end{cases}.$$

The wearable electronic device may calculate the height h and the width w of the ROI 630 as represented by Equation 2 below, for example.

$$h = \sum_{v \in S} w_{v,h} \times v(y), \quad w = \sum_{v \in S} w_{v,w} \times v(x) \qquad \text{Equation 2}$$

A weight $w_{v,w}$ for calculating the width w and a weight $w_{v,h}$ for calculating the height h in Equation 2 may be set as represented by Equation 3 below, for example.

$$w_{v,w} = \begin{cases} 0.25 & \text{if } v \in \{TIP_I^R, DIP_I^R, PIP_I^R, MCP_I^R\} \\ -0.25 & \text{else if } v \in \{TIP_I^L, DIP_I^L, PIP_I^L, MCP_I^L\} \\ 0 & \text{else} \end{cases} \qquad \text{Equation 3}$$

$$w_{v,h} = \begin{cases} 0.25 & \text{if } v \in \{MCP_I^L, MCP_I^R, TIP_T^L, TIP_T^R\} \\ -0.5 & \text{else if } v \in \{TIP_I^L, TIP_I^R\} \\ 0 & \text{else} \end{cases}$$

For example, when the wearable electronic device does not recognize the first gesture from the image frame 605 which is a current frame, the positions of the joints $TIP_T$, $IP_T$, and $MCP_T$ of the thumb and the positions of the joints $TIP_I$, $DIP_I$, $PIP_I$, and $MCP_I$ of the index finger may not be known or determined. In this example, the wearable electronic device may calculate positions of joints of a thumb and an index finger using position and size information of a rectangle corresponding to an ROI in a previous image frame stored in a buffer of the wearable electronic device. In this example, when the current image frame 605 is an image captured at a time t, the previous image frame may be an image captured at a time t−1 or t−2 (e.g., or t−k where k is an integer greater than or equal to 1) that precedes the time t.

When positions of four sides of the ROI 630 in the image frame 605 are determined, the wearable electronic device may extract the ROI 630 based on the center point of the ROI 630 and the length of each side of the ROI 630. The wearable electronic device may store information of the ROI in the buffer.

When it is determined that a second gesture is being performed in the current image frame 605, the wearable electronic device may enlarge the ROI 630 through interpolation or the like and then crop a central portion thereof to store it in the buffer.

For example, a user may perform a gesture, i.e., the second gesture, that enlarges a space between both hands by spreading the hands in a direction indicated by an arrow (e.g., the arrow of either of the examples 520 and 540 of FIG. 5), while the user is taking or forming the first gesture such as the examples 510 and 530 illustrated in FIG. 5.

When it is determined that the second gesture is performed, the wearable electronic device may enlarge the ROI 630 by a fixed scale factor (e.g., 1.5 or 2 magnification) and store it in the buffer. The wearable electronic device may automatically perform such enlargement using a fixed scale factor applied to a previous image frame, on an ROI of an image frame(s) input after the second gesture is determined to be performed. For example, when the user performs the second gesture several times, the wearable electronic device may further enlarge a corresponding image frame, crop a central portion of the enlarged image frame, and store it in the buffer.

The wearable electronic device may project images of ROIs stored in the buffer onto the virtual display such that the user may view the images of the ROIs through a display. When the process described above is all completed, the wearable electronic device may store information as to whether a gesture is recognized in the current image frame 605, and information on the position, the size, a current scale factor, and the like of the ROI 630. The wearable electronic device may store an image of a new image frame obtained from the front camera in the buffer and then repeat the foregoing process.

Figure 7A:
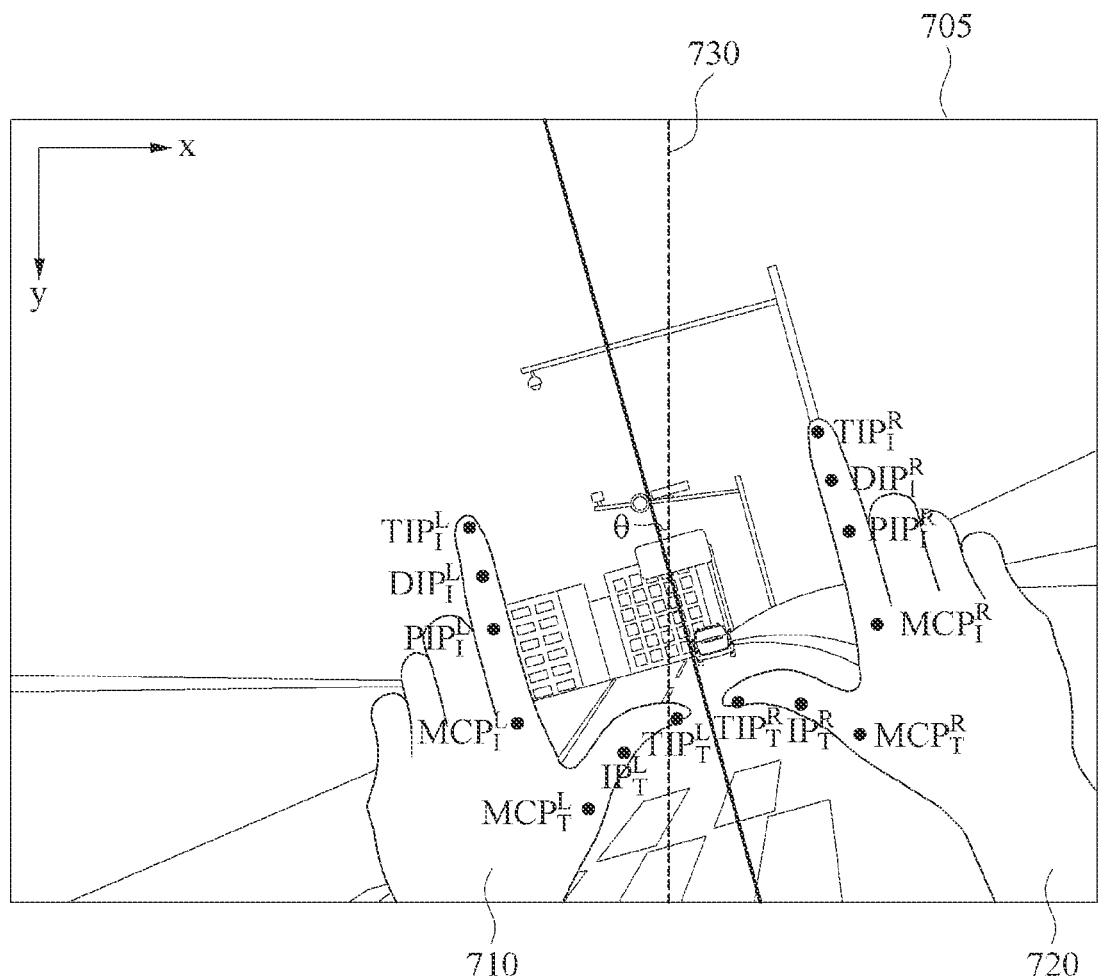
FIGS. 7A through 7C illustrate an example of estimating a rotation angle of a hand.
Figure 7B:
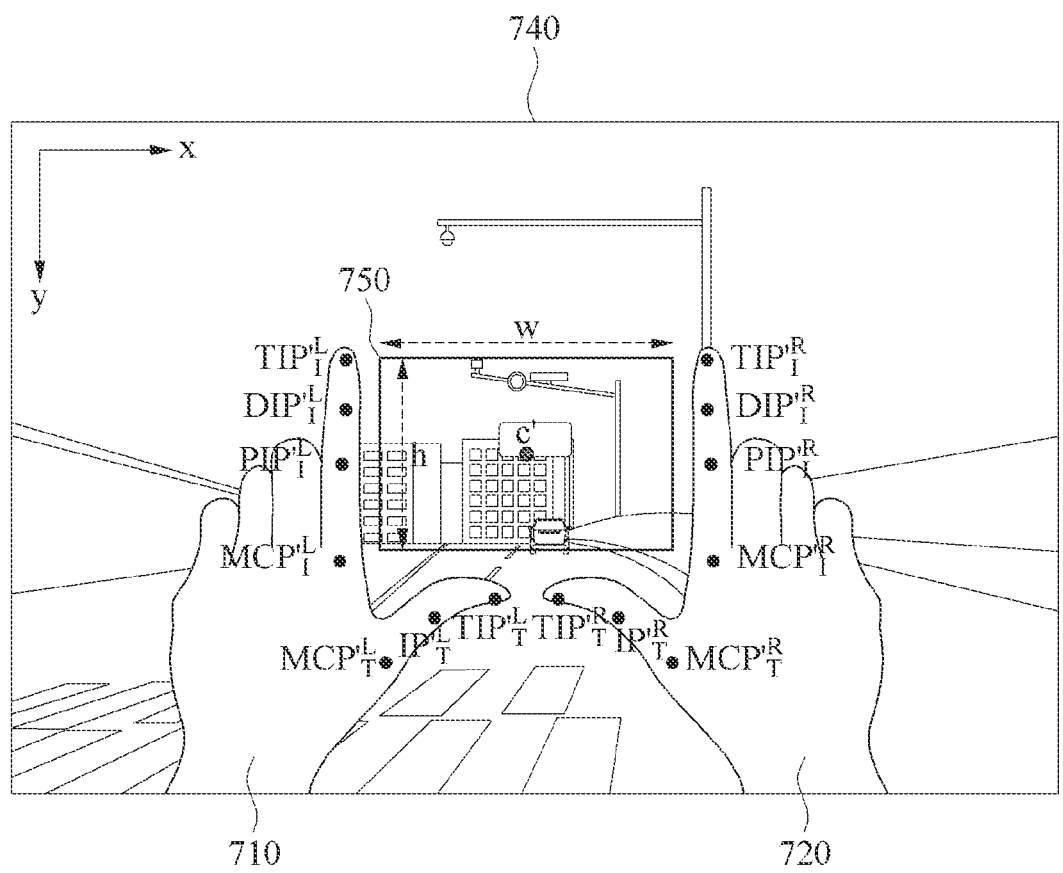
Figure 7C:
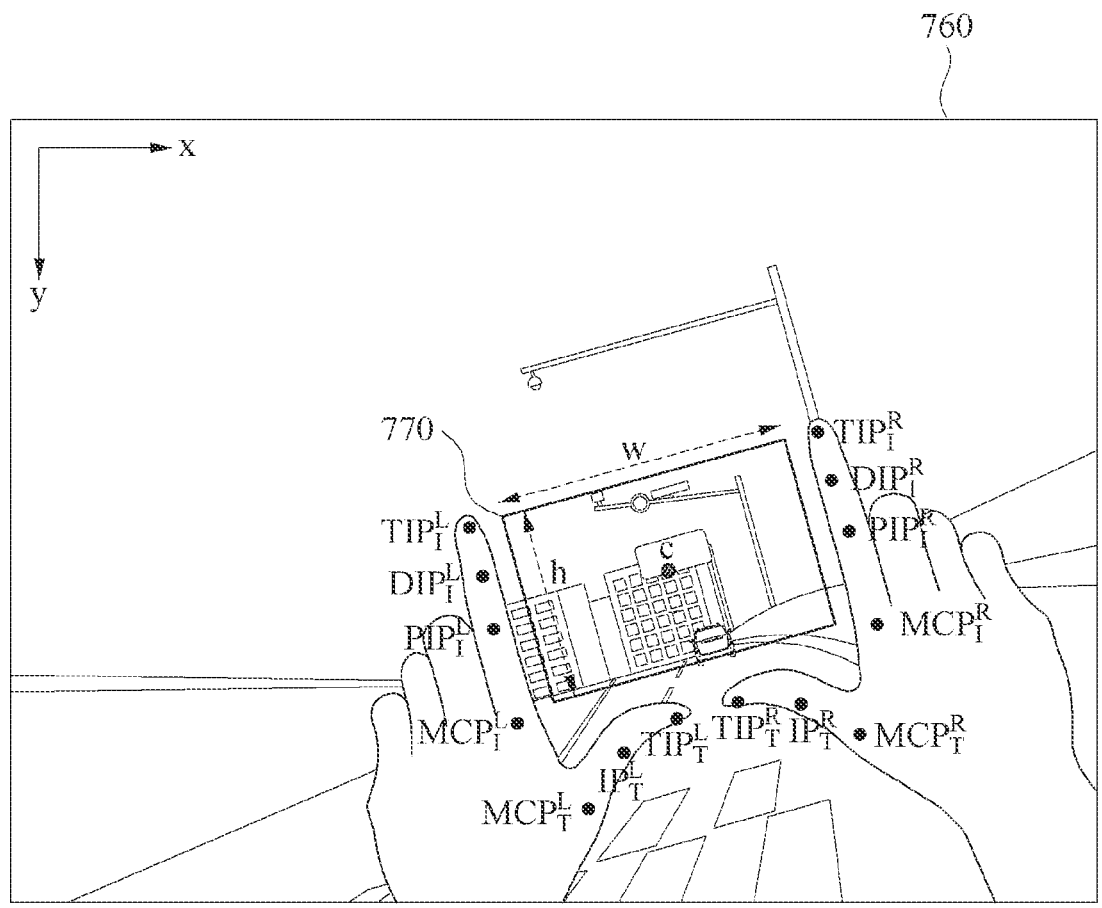

FIGS. 7A through 7C illustrate an example of estimating a rotation angle of a hand. Even when a gesture of a user is performed as being tilted because an image frame is captured tilted, a wearable electronic device of an example embodiment may extract an ROI by estimating a tilt angle of a hand performing the gesture and calculating a center point and a length of each side of the ROI.

Referring to FIG. 7A, for an image frame 705 captured while objects are tilted by an angle, a user may make a gesture (e.g., a first gesture) by tilting both hands 710 and 720 of the user by an angle.

For example, the wearable electronic device may estimate a rotation angle θ by which the hand rotates with respect to a vertical central axis 730 based on a regression between positions of hand joints of the user, as represented by Equation 4 below, for example.

$$\theta = \arctan\left(\frac{\text{mean }(\overline{v}(x)) \cdot \text{mean }(\overline{v}(y)) - \text{mean }(\overline{v}(x) \cdot v(\overline{y}))}{\text{mean }(\overline{v}(y))^2 - \text{mean }(\overline{v}(y)^2)}\right) \quad \text{Equation 4}$$

where $\overline{v}(\cdot) = (v^L(\cdot) + v^R(\cdot))/2$

In Equation 4, $\overline{v}(x)$ denotes an x-axis position coordinate of an average vertex $\overline{V}$ of joints in the image frame 705, and $\overline{v}(y)$ denotes a y-axis position coordinate of the average vertex $\overline{v}$.

In $\overline{v}(\cdot)$, a dot ($\cdot$) in the middle denotes x or y, that is, $\overline{v}(\cdot)$ denotes $\overline{v}(x)$ or $\overline{v}(y)$. Thus, $\overline{v}(\cdot)$ denotes x and y components of the average vertex $\overline{V}$, and may be calculated by an average of x and y components $v^L(\cdot)$ of a left hand vertex and x and y components $v^R(\cdot)$ of a right hand vertex. Here, $\overline{v} \in S$, and s={$TIP_I$, $DIP_I$, $PIP_I$, $MCP_I$, $TIP_T$, $IP_T$, $MCP_T$}

Referring to FIG. 7B, the image frame 705 of FIG. 7A may be adjusted (e.g., reversely rotated) to be an image 740 by an angle θ estimated from the image frame 705.

The wearable electronic device may obtain new (reversely rotated) position coordinates v'(x) and v'(y) of the hand joints from the image 740 rotated from the image frame 705 by the angle θ estimated as described above with reference to FIG. 7A, as represented by Equation 5 below, for example.

$v'(x) = \cos\theta \cdot v(x) - \sin\theta \cdot v(y)$ $v'(y) = \sin\theta \cdot v(x) + \cos\theta \cdot v(y)$ Equation 5:

In Equation 5, $v' \in S'$, and $S'=\{TIP_I^L, TIP_I^R, DIP_I^L, DIP_I^R, PIP_I^L, PIP_I^R, MCP_I^L, MCP_I^R, TIP_T^L, TIP_T^R, IP_T^L, IP_T^R, MCP_T^L, MCP_T^R\}$ For example, the wearable electronic device may calculate a position a center point c' of an ROI 750 and a length (e.g., h and w) of each side of the ROI 750 through a weighted sum of the reversely rotated position coordinates v' of the hand joints, as represented by Equation 6 below, for example.

$$c'(x) = \sum\nolimits_{v' \in S'} w_{v',x} \times v'(x), \ c'(y) = \sum\nolimits_{v' \in S'} w_{v',y} \times v'(y), \quad \text{Equation 6}$$

$$h = \alpha \sum\nolimits_{v' \in S'} w_{v',h} \times v'(y), \ w = \beta \sum\nolimits_{v' \in S'} w_{v',w} \times v'(x)$$

In Equation 6, $S'=\{TIP'_I{}^L, TIP'_I{}^R, DIP'_I{}^L, DIP'_I{}^R, PIP'_I{}^L, PIP'_I{}^R, MCP'_I{}^L, MCP'_I{}^R, TIP'_T{}^L, TIP'_T{}^R, IP'_T{}^L, IP'_T{}^R, MCP'_T{}^L, MCP'_T{}^R\}$ and, coefficients may be, for example, α, β≈0.9. An x-axis weight $w_{v',w}$ may be $$w_{v',x} = \frac{1}{14}, v' \in S',$$

and a y-axis weight $w_{v',y}$ may be $$w_{v',y} = \begin{cases} 0 & \text{if } v' \in \{IP'_T{}^L, IP'_T{}^R, MCP'_I{}^L, MCP'_I{}^R\} \\ 0.1 & \text{else} \end{cases}.$$

In addition, a weight $w_{v',w}$ for calculating a width w of the ROI 750 and a weight $w_{v',h}$ for calculating a height h of the ROI 750 may be set as represented by Equation 7 below, for example.

$$w_{v',w} = \begin{cases} 0.25 & \text{if } v' \in \{TIP'_I{}^R, DIP'_I{}^R, PIP'_I{}^R, MCP'_I{}^R\} \\ -0.25 & \text{else if } v' \in \{TIP'_I{}^L, DIP'_I{}^L, PIP'_I{}^L, MCP'_I{}^L\} \\ 0 & \text{else} \end{cases} \quad \text{Equation 3}$$

$$w_{v',h} = \begin{cases} 0.25 & \text{if } v' \in \{MCP'_I{}^L, MCP'_I{}^R, TIP'_T{}^L, TIP'_T{}^R\} \\ -0.5 & \text{else if } v' \in \{TIP'_I{}^L, TIP'_I{}^R\} \\ 0 & \text{else} \end{cases}$$

Referring to FIG. 7C, the reversely rotated image 740 of FIG. 7B may be re-rotated by an angle θ to be an image 760.

The wearable electronic device may obtain the image 760 by re-rotating the image 740 by the angle θ with respect to a position of the center point c' of the image 740. A height h and a width w of an ROI 770 in the image 760 may be unchanged, that is, maintained to be the same as the height h and the width w of the ROI 750 in the image 740.

Based on this, the wearable electronic device may calculate a position of a center point c of the ROI 770 in the image 760 to be, for example, c=(c(x), c(y)), as represented by Equation 8 below, for example.

$c(x) = \cos\theta \cdot c'(x) + \sin\theta \cdot c'(y)$ $c(y) = -\sin\theta \cdot c'(x) + \cos\theta \cdot c'(y)$ Equation 8:

In Equation 8, c' may correspond to the position of the center point c' of the ROI 750 in a reversely rotated image such as the image 740 of FIG. 7B.

Figure 8:
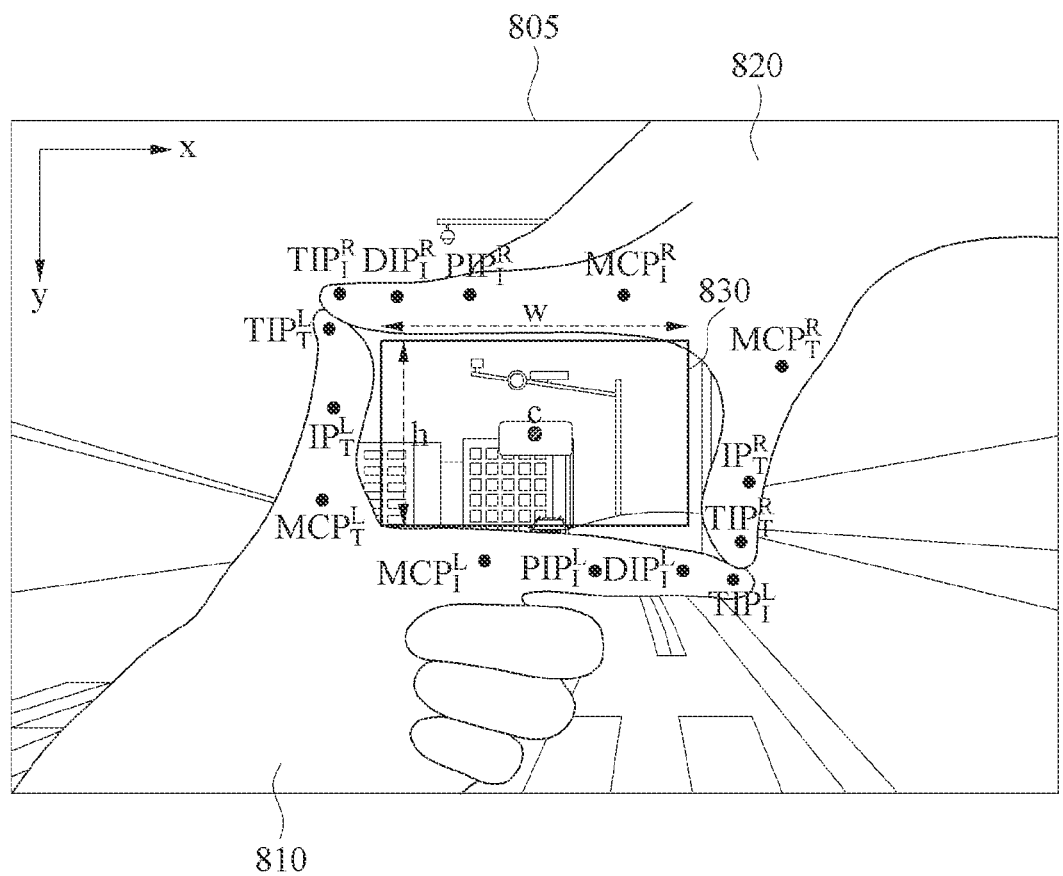
FIGS. 8 and 9 illustrate examples of calculating a rotation angle of a hand.

FIG. 8 illustrates an example of calculating a rotation angle of a hand. Referring to FIG. 8, for an image frame 805 captured by a front camera of a wearable electronic device, a user may perform a gesture (e.g., a first gesture) of a second type with a left hand 810 and a right hand 820 of the user.

When the user performs the gesture defining an ROI 830 with the hands 810 and 820 by a form that is different from those illustrated in FIGS. 7A through 7C, the wearable electronic device may calculate or obtain a position of a center point c of the ROI 830 and a height h and a width w of the ROI 830 using a weight different from one that is described above with reference to FIGS. 7A through 7C.

The wearable electronic device may directly calculate position coordinates of the center point c of the ROI 830, without a reverse rotation and a re-rotation described above with reference to FIG. 7A through 7C, using Equation 9 below, for example.

$$c(x) = \sum\nolimits_{v \in S} \frac{v(x)}{14}, \ c(y) = \sum\nolimits_{v \in S} \frac{v(y)}{14} \quad \text{Equation 9}$$

In Equation 9, $S=\{TIP_I^L, TIP_I^R, DIP_I^L, DIP_I^R, PIP_I^L, PIP_I^R, MCP_I^L, MCP_I^R, TIP_T^L, TIP_T^R, IP_T^L, IP_T^R, MCP_T^L, MCP_T^R\}$ The wearable electronic device may calculate average values of x-axis and y-axis coordinates of hand joints of the hands 810 and 820 to be position coordinates of the center point c of the ROI 830.

For example, the wearable electronic device may calculate the height h and the width w of the ROI 830 as represented by Equation 10 below, for example.

$h = \alpha \cdot (\|TIP_T^L - MCP_T^L\| + \|TIP_T^R - MCP_T^R\|)$ $w = \beta \cdot (\|TIP_I^L - MCP_I^L\| + \|TIP_I^R - MCP_I^R\|)$ Equation 10:

In Equation 10, coefficients may be, for example, α, 62 ≈ 0.5.

In addition, the wearable electronic device may calculate an angle θ by which a hand is rotated with respect to a vertical central axis, as represented by Equation 11 below, for example.

$$\theta = \frac{1}{2}\left\{\arctan\left(\frac{\sum_{v \in I_L}\frac{v(x)}{4} \cdot \sum_{v \in I_L}\frac{v(y)}{4} - \sum_{v \in I_L}\frac{v(x) \cdot v(y)}{4}}{\sum_{v \in I_L}\frac{v(x)}{4} \cdot \sum_{v \in I_L}\frac{v(x)}{4} - \sum_{v \in I_L}\frac{v(x) \cdot v(x)}{4}}\right) + \arctan\left(\frac{\sum_{v \in I_R}\frac{v(x)}{4} \cdot \sum_{v \in I_R}\frac{v(y)}{4} - \sum_{v \in I_R}\frac{v(x) \cdot v(y)}{4}}{\sum_{v \in I_R}\frac{v(x)}{4} \cdot \sum_{v \in I_R}\frac{v(x)}{4} - \sum_{v \in I_R}\frac{v(x) \cdot v(x)}{4}}\right)\right\}$$

Equation 11

In Equation 11, $I_L = \{TIP_I^L, DIP_I^L, PIP_I^L, MCP_I^L\}$ and, $I_R = \{TIP_I^R, DIP_I^R, PIP_I^R, MCP_I^R\}$.

Figure 9:
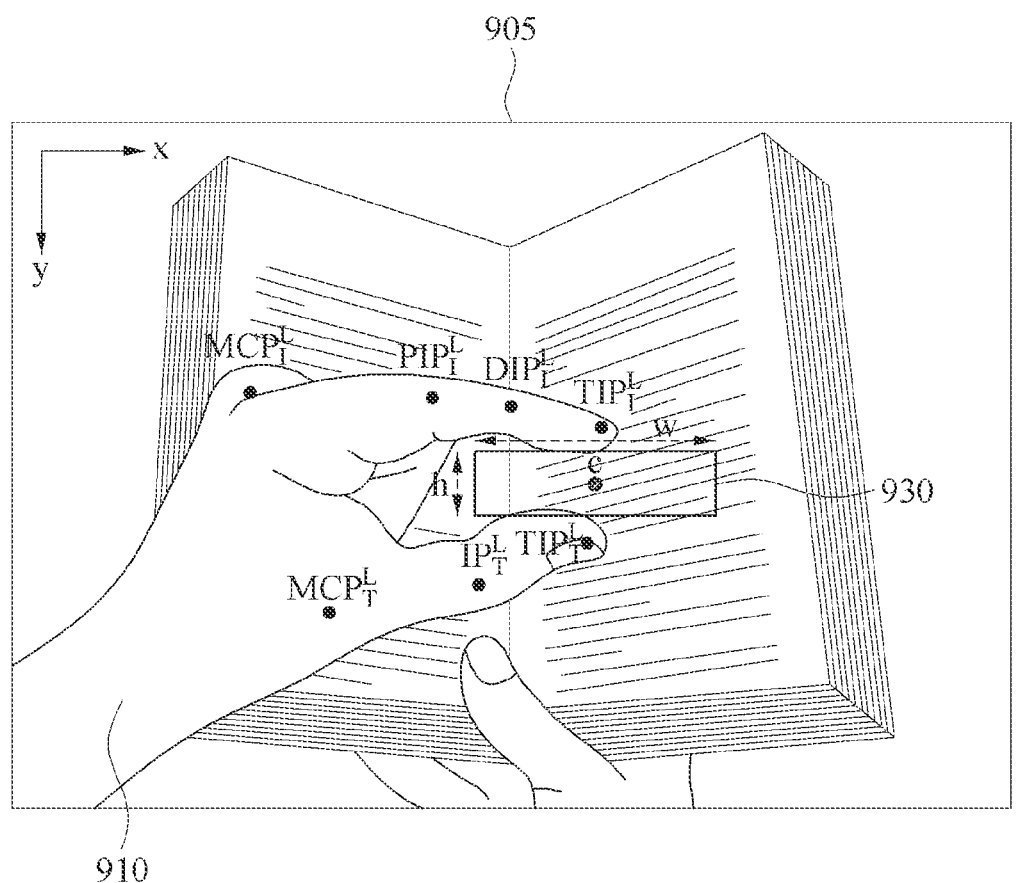

FIG. 9 illustrates an example of calculating a rotation angle of a hand. Referring to FIG. 9, for an image frame 905 captured by a front camera of a wearable electronic device, a user may perform a gesture (e.g., a first gesture) of a third type with a left hand 910.

When the user performs the gesture defining an ROI 930 with the hand 910 by a form different from one illustrated in FIG. 8, the wearable electronic device may calculate or obtain a position of a center point c of the ROI 930 and a height h and a width w of the ROI 930 using a weight different from one that is described above with reference to FIG. 8.

For example, the wearable electronic device may directly calculate position coordinates of the center point c of the ROI 930, as represented by Equation 12 below, for example.

$$c(x) = \frac{TIP_I^*(x) + TIP_T^*(x)}{2}, \quad c(y) = \frac{TIP_I^*(y) + TIP_T^*(y)}{2}$$

Eqaution 12

In Equation 12, $TIP_I$ denotes an index finger tip joint, and $TIP_T$ denotes a thumb tip joint.

In addition, $* \in \{L, R\}$.

The wearable electronic device may calculate an average of an x-axis coordinate $TIP^*_T(x)$ of the thumb tip joint $TIP_T$ of both hands or any one hand and an x-axis coordinate $TIP^*_I(x)$ of the index finger tip joint $TIP_I$, and calculate an x coordinate of the center point c of the ROI 930. The wearable electronic device may calculate an average of a y-axis coordinate $TIP^*_T(y)$ of the thumb tip joint $TIP_T$ of both hands or any one hand and a y-axis coordinate $TIP^*_I(y)$ of the index finger tip joint $TIP_I$, and calculate a y coordinate of the center point c of the ROI 930.

For example, the wearable electronic device may calculate a height h and a width w of the ROI 930, as represented by Equation 13 below, for example.

$$h = \alpha \cdot \|TIP_I^* - TIP_T^*\|$$
$$w = \beta \cdot \left\|\frac{DIP_I^* + IP_T^*}{2} - \frac{TIP_I^* + TIP_T^*}{2}\right\|$$

Equation 13

In Equation 13, coefficients may be, for example, α≈0.9, β≈2.

The wearable electronic device may calculate the height h of the ROI 930 by a difference between a position of the index finger tip joint $TIP_I$ and a position of the thumb tip joint $TIP_T$ of both hands or any one hand (e.g., a left hand L). In addition, the wearable electronic device may calculate the width w of the ROI 930 by a difference between an average position between a first knuckle $DIP^*_I$ of an index finger of both hands or any one hand and a first knuckle $IP^*_T$ of a thumb of both hands or any one hand and an average position between a tip joint $TIP_I$ of the index finger and a tip joint $TIP_T$ of the thumb.

In addition, the wearable electronic device may calculate an angle θ by which a hand is rotated with respect to a vertical central axis, as represented by Equation 14 below, for example.

$$\theta = \frac{1}{2}\left\{\arctan\left(\frac{PIP_I^*(y) - TIP_I^*(y)}{PIP_I^*(x) - TIP_I^*(x)}\right) + \arctan\left(\frac{IP_T^*(y) - TIP_T^*(y)}{IP_T^*(x) - TIP_T^*(x)}\right)\right\}$$

Equation 14

In Equation 14, $I_L = \{TIP_I^L, DIP_I^L, PIP_I^L, MCP_I^L\}$ and, $I_R = \{TIP_I^R, DIP_I^R, PIP_I^R, MCP_I^R\}$.

Figure 10:
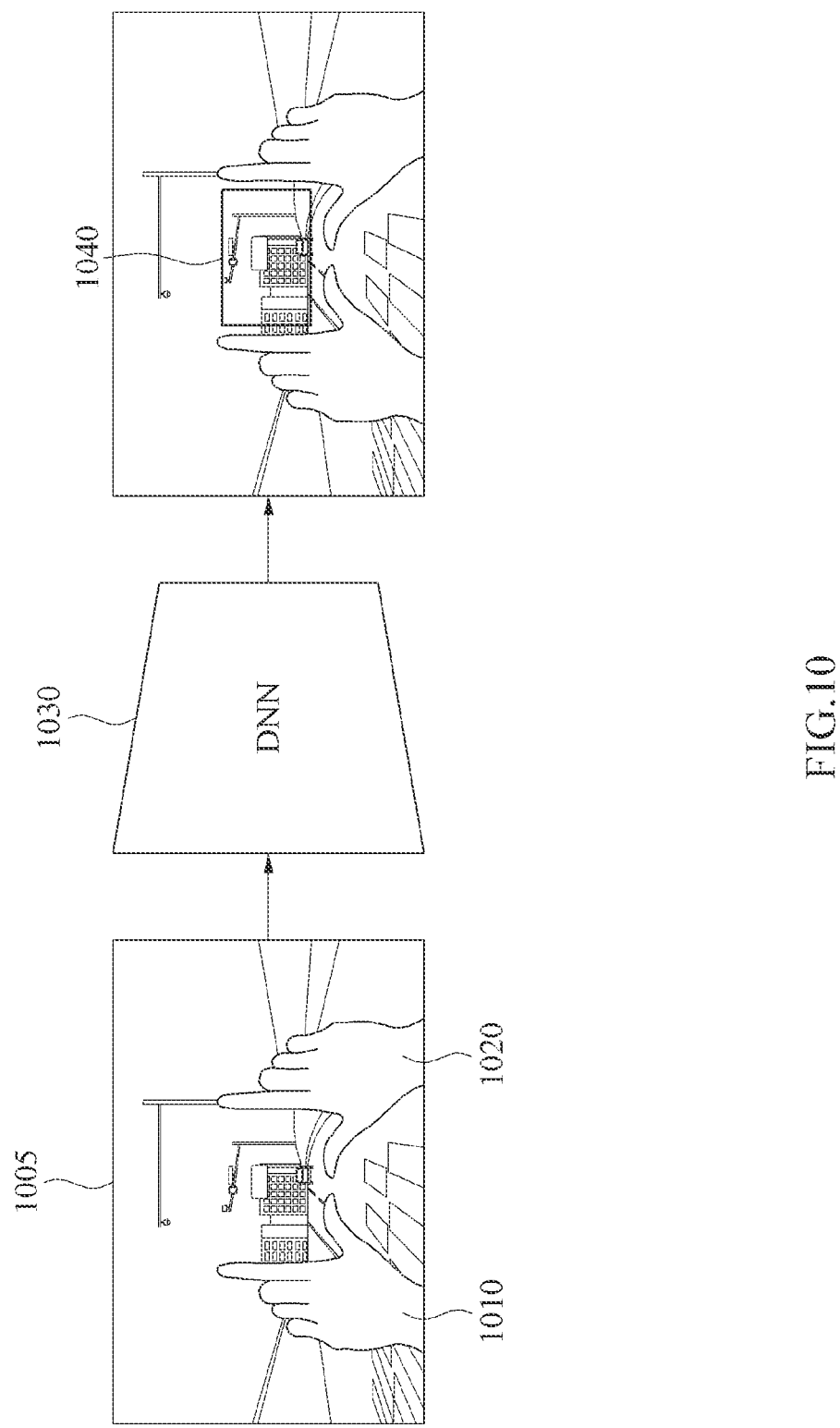
FIG. 10 illustrates an example of estimating an ROI.

FIG. 10 illustrates an example of estimating an ROI. Referring to FIG. 10, for an image 1005 captured by a front camera of a wearable electronic device, a user may perform a gesture (e.g., a first gesture) of a first type by a left hand 1010 and a right hand 1020.

The wearable electronic device may estimate an ROI 1040 by estimating a pose of the hands 1010 and 1020 from the image 1005, using a pre-trained deep neural network (DNN) 1030.

The wearable electronic device may estimate the pose of the hands 1010 and 1020 from the image 1005 through the neural network 1030 and estimate positions of hand joints of the user from the estimated pose. The wearable electronic device may calculate a central position of the ROI 1030 and a length of each side of the ROI 1030 from the estimated positions of the hand joints.

For the neural network 1030 to estimate the pose of the hands 1010 and 1020 from the image 1005, various pose estimation algorithms, such as, for example, a probability graph model-based belief propagation algorithm or a hidden Markov model, but examples of which are not limited thereto.

Figure 11:
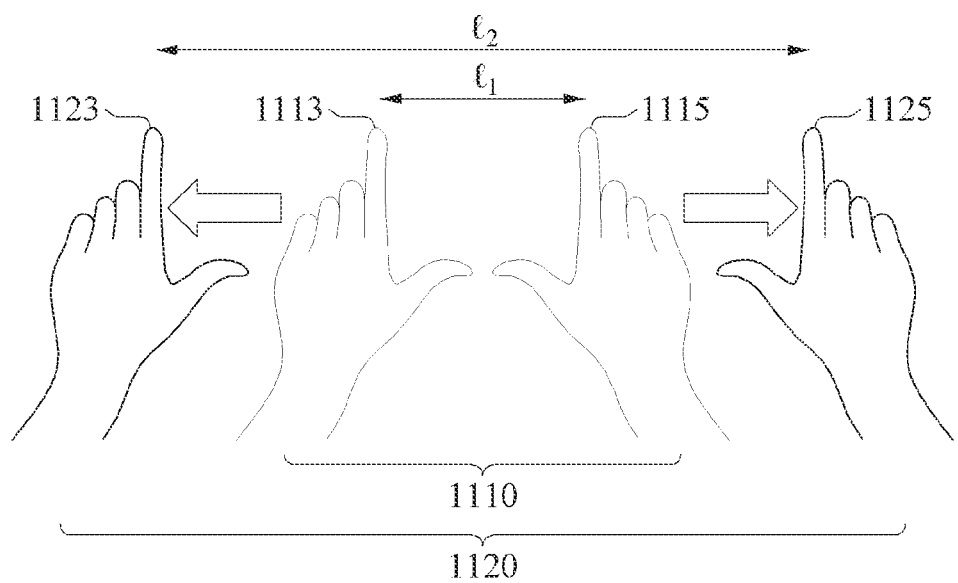
FIG. 11 illustrates an example of adjusting a size of an ROI by a variable ratio.

FIG. 11 illustrates an example of adjusting a size of an ROI by a variable ratio. Referring to FIG. 11, illustrated are a position of both hands 1110 making a first gesture of a first type and a position of both hands 1120 making a second gesture expanding the first gesture. A wearable electronic device of an example embodiment may select a target (e.g., an ROI) to be enlarged, by an area having a size, not by a point.

For example, a distance between both index fingers in the first gesture made by the hands 1110 may be a first distance $I_1$, and a distance between both index fingers in the second gesture made by the hands 1120 may be a second distance $I_2$.

The wearable electronic device may adjust the size of an ROI by a variable ratio based on the first distance between the index fingers of the hands 1110 in the first gesture and the second distance between the index fingers of the hands 1120 in the second gesture. For example, the wearable electronic device may adjust the size of the ROI by the variable ratio that is based on the first distance $I_1$ between respective tips 1113 and 1115 of the index fingers of the hands 1110 making the first gesture and the second distance $I_2$ between respective tips 1123 and 1125 of the index fingers of the hands 1120 making the second gesture. The variable ratio may be, for example, $I_2/I_1$, but is not necessarily limited thereto.

The wearable electronic device may project the ROI of the adjusted size onto a virtual display.

Figure 12:
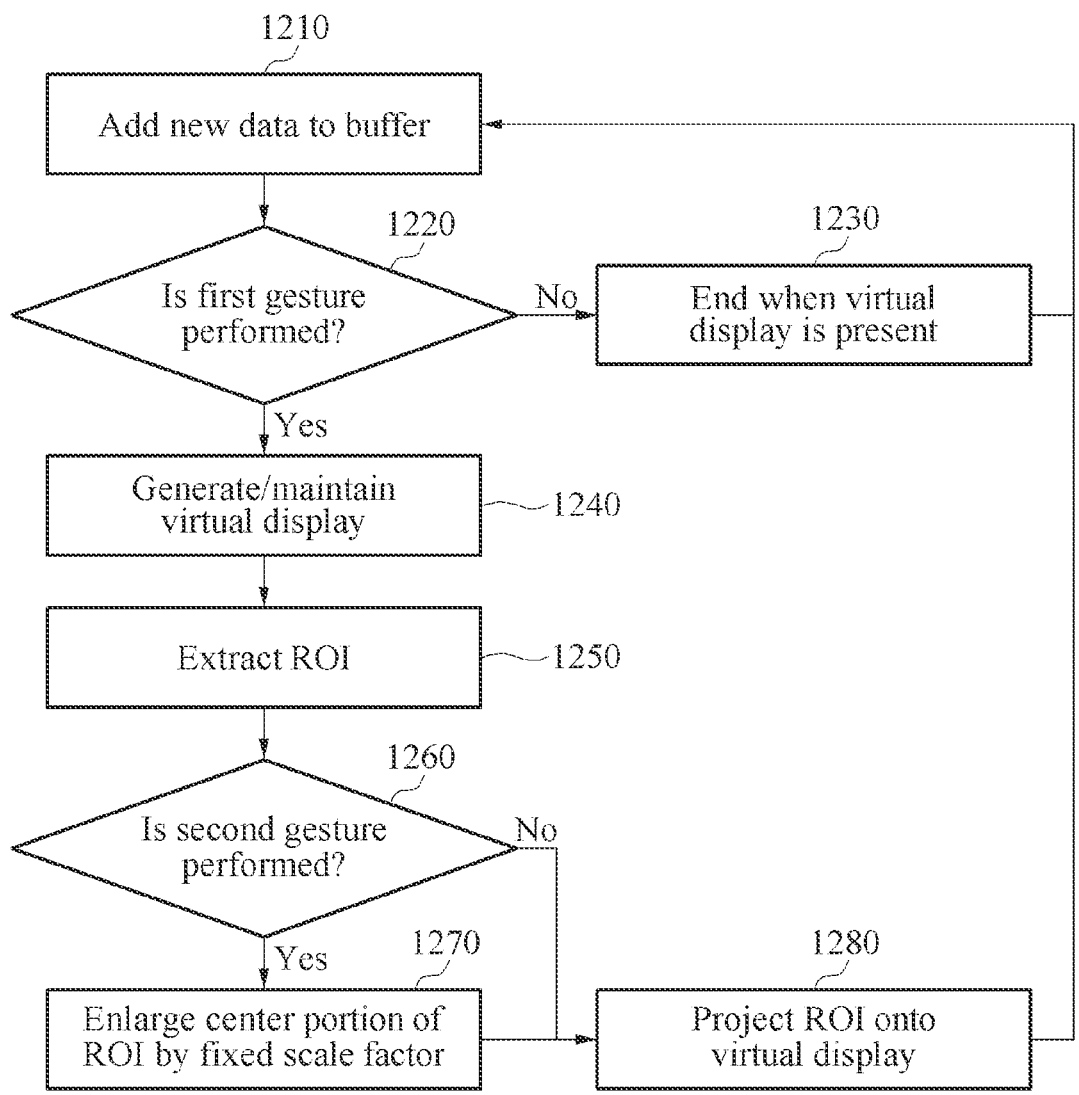
FIG. 12 illustrates an example of a method of operating a wearable electronic device.

FIG. 12 illustrates an example of a method of operating a wearable electronic device. Operations to be described hereinafter with reference to FIG. 12 may be performed in sequential order, but are not necessarily performed in sequential order. For example, the operations may be performed in different orders, and at least two of the operations may be performed in parallel.

Referring to FIG. 12, a wearable electronic device of an example embodiment may project an ROI onto a virtual display through operations 1210 through 1280.

In operation 1210, the wearable electronic device may add, to a buffer, data such as gesture determination information and ROI information associated with an image obtained by a front camera and a previous frame.

In operation 1220, the wearable electronic device may determine whether a first gesture is performed based on the data added to the buffer in operation 1210. In this case, to determine whether the first gesture is performed, the wearable electronic device may determine whether a hand of a user of which an image is captured by the front camera performs the first gesture on a current frame. A non-limiting example of the determining of whether the first gesture is performed by the wearable electronic device will be described in further detail with reference to FIG. 13.

In operation 1220, when the first gesture is not continuously recognized from the current frame for a preset time (e.g., 2 seconds), the wearable electronic device may determine that the first gesture is not performed. In operation 1230, when it is determined in operation 1220 that the first gesture is not performed, the wearable electronic device may determine whether a virtual display is present and end an operation when the virtual display is present. Subsequently, the wearable electronic device may store data of a subsequent frame in the buffer in operation 1210.

In operation 1240, when it is determined in operation 1220 that the first gesture is performed, the wearable electronic device may generate or maintain the virtual display. For example, the wearable electronic device may generate the virtual display 1 m ahead of a gaze of the user. A position at which the wearable electronic device is to generate the virtual display may be variable according to a setting by the user. When the virtual display is previously generated, the wearable electronic device may maintain the virtual display in operation 1240.

In operation 1250, the wearable electronic device may extract an ROI from an image frame captured by the camera.

In operation 1260, the wearable electronic device may determine whether a second gesture is performed. In operation 1270, when it is determined in operation 1260 that the second gesture is performed, the wearable electronic device may enlarge a central portion of the ROI by a fixed scale factor.

In operation 1280, when it is determined in operation 1260 that the second gesture is performed, the wearable electronic device may project the ROI extracted in operation 1250 onto the virtual display.

Figure 13:
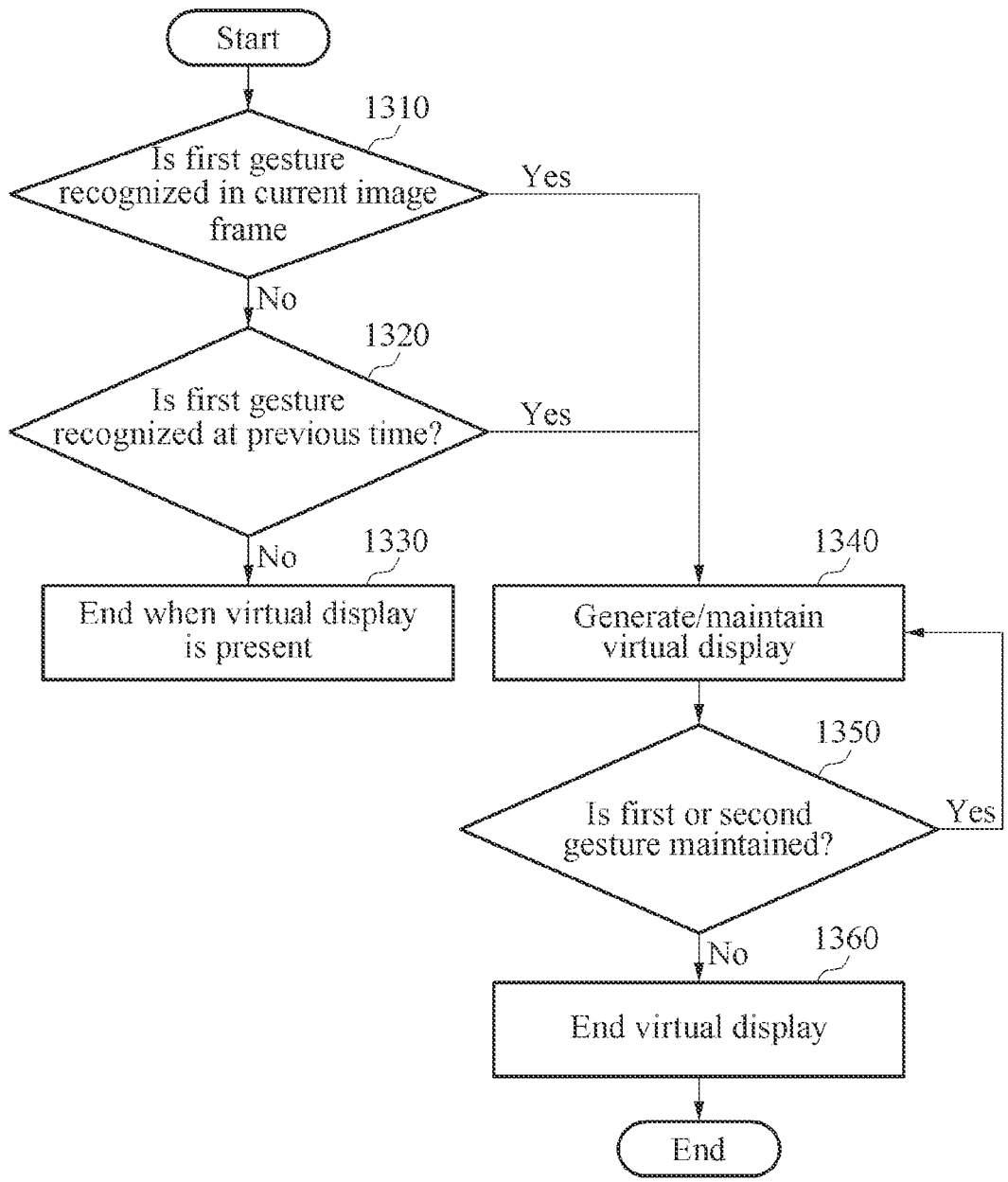
FIG. 13 illustrates an example of determining whether a first gesture is recognized.

FIG. 13 illustrates an example of determining whether a first gesture is recognized. Operations to be described hereinafter with reference to FIG. 13 may be performed in sequential order, but are not necessarily performed in sequential order. For example, the operations may be performed in different orders, and at least two of the operations may be performed in parallel.

Referring to FIG. 13, a wearable electronic device of an example embodiment may determine whether a first gesture is recognized through operations 1310 through 1360.

In operation 1310, the wearable electronic device may determine whether the first gesture is recognized in a current frame, that is, whether the first gesture is recognized from the current frame. When there is information indicating that the first gesture was recognized from a previous frame(s) even when the first gesture is not recognized in operation 1310, the wearable electronic device may determine that the first gesture is maintained and then perform a subsequent operation.

In operation 1320, when it is determined in operation 1310 that the first gesture is not recognized, the wearable electronic device may search for whether the first gesture is recognized in a previous frame corresponding to a previous time that precedes the current frame.

In operation 1330, when the first gesture is not recognized in operation 1320, the wearable electronic device may determine whether a previously generated virtual display is present and end an operation when the virtual display is present.

When the first gesture is recognized in operation 1320, the wearable electronic device may generate the virtual display in operation 1340 and determine whether the first gesture or a second gesture is maintained in operation 1350.

When it is determined in operation 1350 that the first gesture or the second gesture is maintained, the wearable electronic device may maintain the virtual display in operation 1340. When it is determined in operation 1350 that the first gesture or the second gesture is not maintained, the wearable electronic device may end the virtual display in operation 1360.

When it is determined in operation 1310 that the first gesture is recognized, the wearable electronic device may generate the virtual display in operation 1340 and then determine whether the first gesture or the second gesture is maintained in operation 1350. When it is determined in operation 1350 that the first gesture or the second gesture is not maintained, the wearable electronic device may end the virtual display in operation 1360.

Figure 14:
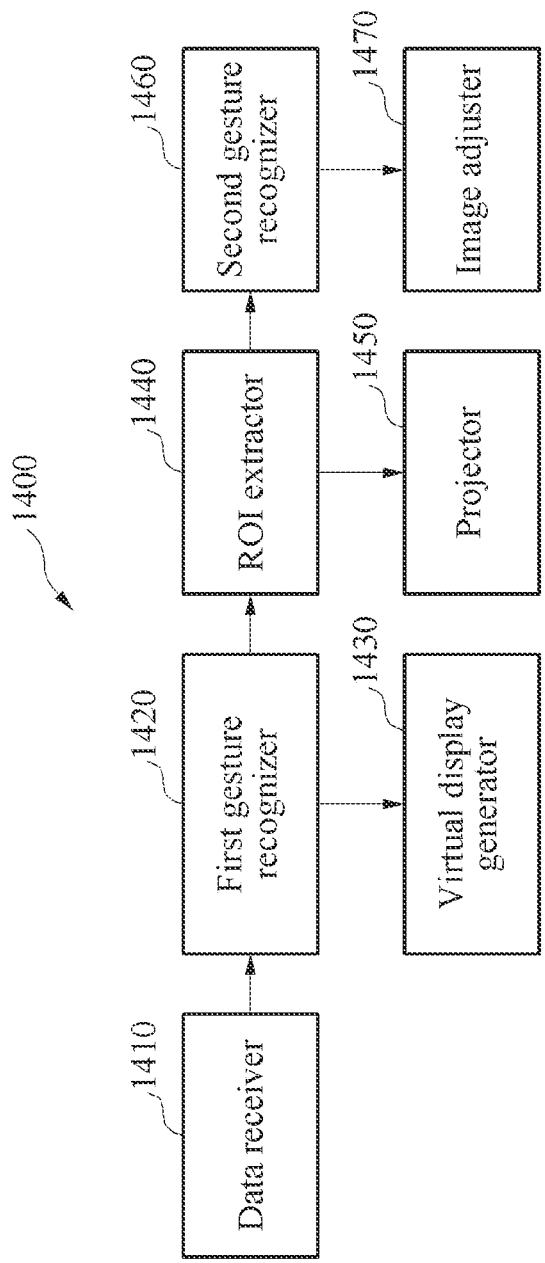
FIG. 14 illustrates an example of a wearable electronic device.

FIG. 14 illustrates an example of a wearable electronic device. Referring to FIG. 14, a wearable electronic device 1400 may include a data receiver 1410, a first gesture recognizer 1420, a virtual display generator 1430, an ROI extractor 1440, a projector 1450, a second gesture recognizer 1460, and an image adjuster 1470.

The data receiver 1410 may receive, in real time, sensor data used to extract an ROI. For example, the data receiver 1410 may receive a video frame output in real time from a front camera (not shown) of the wearable electronic device 1400 and/or an additional sensor output for recognizing a gesture of a hand of a user.

The first gesture recognizer 1420 may determine whether the user performs a first gesture of the hand for starting extraction of an ROI. When it is determined that the user performs the first gesture, the virtual display generator 1430 may generate a virtual display for projecting the ROI. A position of the virtual display generated may be, for example, a position set by the user, a position adjacent to the hand performing the first gesture, or a position adjacent to the wearable electronic device 1400, but is not limited thereto.

When the virtual display is generated by the virtual display generator 1430, the ROI extractor 1440 may reproduce or extract image information of a rectangular region (e.g., the ROI) defined by the first gesture of the hand in the image frame captured by the front camera.

The projector 1450 may project, onto the virtual display, the image information of the ROI reproduced or extracted by the ROI extractor 1440. In this case, the ROI extractor 1440 may extract the ROI using information on estimated 3D or 2D positions of hand joints of the user. For example, the ROI extractor 1440 may determine a size and position of a rectangle corresponding to the ROI through a weighted sum of position coordinates of joints of a thumb and an index finger among the estimated hand joints.

To assist the user with a vision by enlarging further the ROI, a gesture that expands the first gesture, that is, a second gesture, for example, the second gestures 520, 540, and 560 illustrated in FIG. 5, may be performed. In this case, the second gesture recognizer 1460 may determine whether the user performs the second gesture. When it is determined that the user performs the second gesture by the second gesture recognizer 1460, the image adjuster 1470 may adjust (e.g., expand) the size of the ROI extracted by the ROI extractor 1440 and project the ROI of the adjusted size onto the virtual display. For example, the image adjuster 1470 may adjust the size of the ROI through interpolation or upscaling.

For example, there may be some cases in which the user has a hard time verifying an object with the naked eye, the user desires to view an object more closely (e.g., zoomed in), or the user has a failing vision due to congenital or acquired causes and an image is thus not formed on retinae. In these cases, with the wearable electronic device 1400 on, the user may view image information that is obtained from the front camera of the wearable electronic device 1400 and is projected onto the virtual display, and the vision of the user may thereby be assisted.

Figure 15:
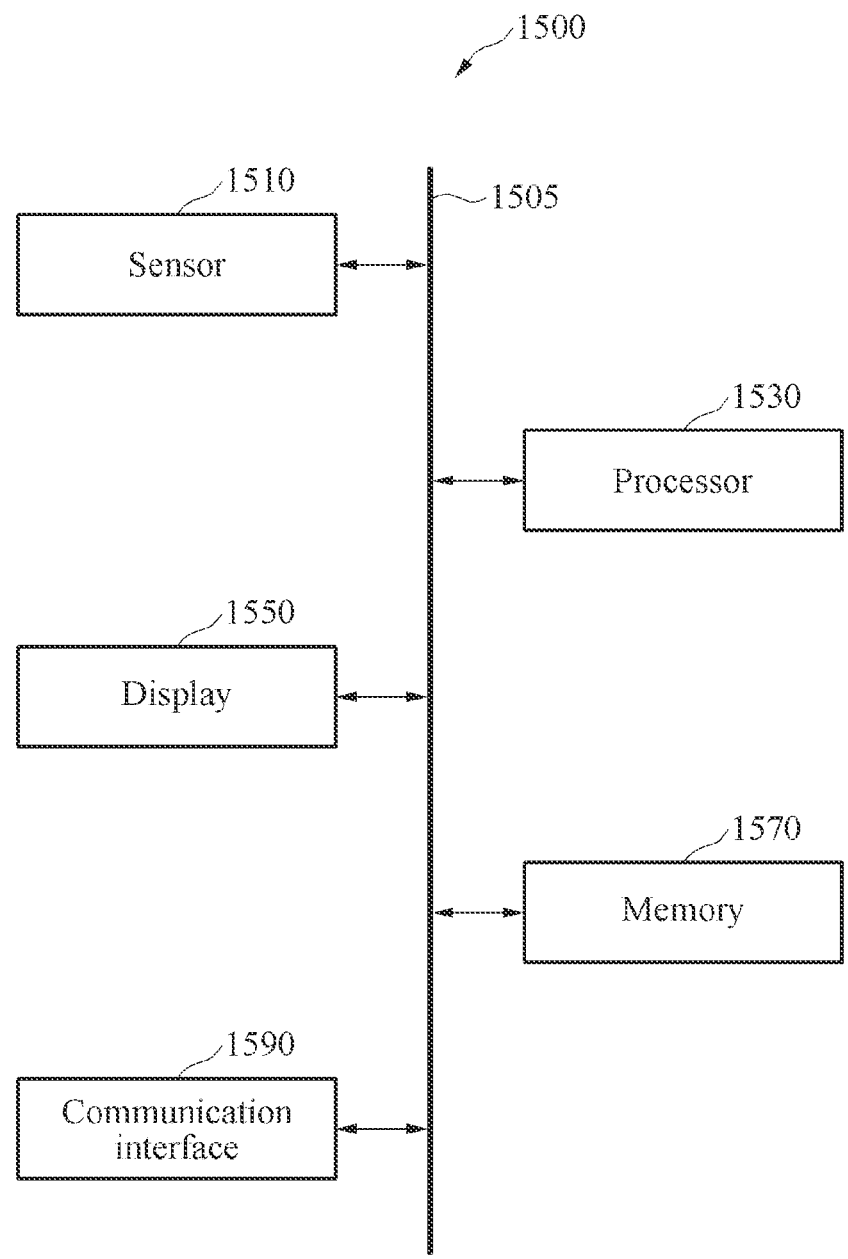
FIG. 15 illustrates an example of a wearable electronic device.

FIG. 15 illustrates an example of a wearable electronic device. Referring to FIG. 15, a wearable electronic device 1500 may include a sensor 1510 (e.g., one or more sensors), a processor 1530 (e.g., one or more processors), a display 1550, a memory 1570 (e.g., one or more memories), and a communication interface 1590.

The sensor 1510, the processor 1530, the display 1550, and the memory 1570 may communicate with one another through a communication bus 1505 or an Internet protocol assigned to each of the sensor 1510, the processor 1530, the display 1550, and the memory 1570.

The sensor 1510 may include, for example, a camera or an image sensor (e.g., any one or more or all of the cameras and image sensors mention above with respect to FIGS. 1-14), and a motion sensor for estimating a pose of a hand of a user, but is not limited thereto. The camera may be disposed on a front surface of the wearable electronic device 1500 to obtain an image frame corresponding to a view of the camera.

The processor 1530 may recognize a first gesture of the hand of the user for setting an ROI corresponding to a view of the user in the image frame corresponding to the view of the camera. The processor 1530 may generate a virtual display for projecting the ROI based on whether the first gesture is recognized. The processor 1530 may extract the ROI from the image frame. The processor 1530 may recognize a second gesture of the hand for adjusting the size of the ROI. The processor 1530 may adjust the size of the ROI and project it onto the virtual display based on whether the second gesture is recognized.

The display 1550 may display image content of an image of which the ROI is projected onto the virtual display by the processor 1530.

The memory 1570 may store various information generated in a processing process of the processor 1530. In addition, the memory 1570 may store various data and programs. The memory 1570 may include a volatile memory or a nonvolatile memory. The memory 1570 may include a large-capacity storage medium such as a hard disk to store various data.

The communication interface 1590 may receive, in real time, sensor data used to extract an ROI. For example, the communication interface 1590 may receive a video frame output from the front camera (not shown) of the wearable electronic device 1500 and/or an additional sensor output for recognizing a gesture of the hand of the user.

The processor 1530 may execute executable instructions included in the memory 1570. The processor 1530 may execute a program and control the wearable electronic device 1500. A code of the program to be executed by the processor 1530 may be stored in the memory 1570. In addition, the processor 1530 may perform one or more, or all, of the methods and operations described above with reference to FIGS. 1 through 14. The processor 1530 may be a hardware-implemented processing device having a physically structured circuit to execute desired operations. The desired operations may include, for example, codes or instructions included in a program. The wearable electronic device 1500 that is a hardware-implemented wearable device may include, for example, a microprocessor, a central processing unit (CPU), a graphics processing unit (GPU), a processor core, a multi-core processor, a multiprocessor, an application-specific integrated circuit (ASIC), a field-programmable gate array (FPGA), and a neural processing unit (NPU).

The wearable electronic devices, displays, data receivers, first gesture recognizers, virtual display generators, ROI extractors, projectors, second gesture recognizers, image adjusters, wearable electronic devices, sensors, processors, displays, memories, communication interfaces, communication buses, wearable electronic device 110, display 115, wearable electronic device 330, wearable electronic device 1400, data receiver 1410, first gesture recognizer 1420, virtual display generator 1430, ROI extractor 1440, projector 1450, second gesture recognizer 1460, image adjuster 1470, wearable electronic device 1500, sensor 1510, processor 1530, display 1550, memory 1570, communication interface 1590, communication bus 1505, and other apparatuses, devices, units, modules, and components described herein with respect to FIGS. 1-15 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-15 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A method of operating a wearable electronic device, the method comprising:
recognizing a first gesture of a hand of a user for setting a region of interest (ROI) corresponding to a view of the user in an image frame corresponding to a view of a camera;
generating a virtual display for projecting the ROI based on whether the first gesture is recognized;
determining positions of at least two hand joints of a finger of the hand in the image frame;

determining the ROI using the positions of the at least two hand joints;
extracting the ROI from the image frame;
recognizing a second gesture of the hand for adjusting a size of the ROI; and
adjusting the size of the ROI and projecting the ROI of the adjusted size onto the virtual display, based on whether the second gesture is recognized,
wherein the determining the positions of the at least two hand joints comprises:
determining a rotation angle of the hand based on the positions of the at least two hand joints; and
determining new positions of the at least two hand joints by adjusting the determined rotation angle of the hand from previous positions to the new positions, and
wherein the extracting the ROI comprises extracting the ROI based on the new positions of the at least two hand joints.

2. The method of claim 1, wherein the determining the positions of the at least two hand joints comprises:
determining the positions of the at least two hand joints from the image frame for each type of the first gesture.

3. The method of claim 2, wherein the extracting the ROI comprises:
setting the ROI using the positions of the at least two hand joints determined for each type of the first gesture.

4. The method of claim 1, wherein
the
determining the rotation angle of the hand is based on a regression between the positions of the at least two hand joints.

5. The method of claim 1, wherein the extracting the ROI comprises:
determining a center point of the ROI and a length of each side of the ROI based on a weighted sum between the determined positions of the at least two hand joints; and
extracting the ROI based on the center point of the ROI and the length of each side of the ROI.

6. The method of claim 1, wherein the extracting the ROI comprises:
determining a hand pose of the user using a pre-trained neural network;
determining the positions of the at least two hand joints of the user from the determined hand pose; and
determining a central position of the ROI and a length of each side of the ROI from the determined positions of the at least two hand joints.

7. The method of claim 1, wherein the virtual display is displayed based on whether either one of the first gesture and the second gesture is maintained.

8. The method of claim 1, wherein the generating the virtual display comprises:
generating the virtual display irrespective of a position of the view of the camera.

9. The method of claim 1, wherein the recognizing the first gesture comprises:
in response to the first gesture not being recognized in the image frame, recognizing the first gesture in a previous image frame of the image frame.

10. The method of claim 1, wherein the projecting onto the virtual display comprises:
in response to the second gesture being recognized, enlarging a central portion of the ROI by a fixed scale factor; and
projecting the enlarged central portion onto the virtual display.

11. The method of claim 1, wherein the projecting onto the virtual display comprises:
adjusting the size of the ROI by a variable ratio that is based on a first distance between index fingers of both hands of the user in the first gesture and a second distance between the index fingers of the hands in the second gesture; and
projecting the ROI of the adjusted size onto the virtual display.

12. The method of claim 1, further comprising:
in response to the second gesture not being recognized, projecting the ROI without the adjusted size onto the virtual display.

13. The method of claim 1, wherein the wearable electronic device comprises any one or any combination of any two or more of smart glasses, virtual reality (VR) glasses, a head-mounted display (HMD), an eye-mounted display (EMD), an augmented reality (AR) device, a VR device, and a mixed reality (MR) device.

14. A non-transitory computer-readable storage medium storing instructions that, when executed by one or more processors, configure the one or more processors to perform the method of claim 1.

15. A wearable electronic device comprising:
a camera configured to obtain an image frame; and
one or more processors configured to:
recognize a first gesture of a hand of a user for setting a region of interest (ROI) corresponding to a view of the user in the image frame corresponding to a view of the camera;
generate a virtual display for projecting the ROI based on whether the first gesture is recognized;
determine positions of at least two hand joints of a finger of the hand in the image frame;
determine the ROI using the positions of the at least two hand joints;
extract the ROI from the image frame;
recognize a second gesture of the hand for adjusting a size of the ROI; and
adjust the size of the ROI based on whether the second gesture is recognized and project the ROI of the adjusted size onto the virtual display;
wherein the one or more processors are configured to:
for the determining the positions of the hand joints,
determine a rotation angle of the hand based on the positions of the at least two hand joints, and
determine new positions of the at least two hand joints by adjusting the determined rotation angle of the hand from previous positions to the new positions, and
for the extracting the ROI, extract the ROI based on the new positions of the at least two hand joints.

16. The device of claim 15, wherein the one or more processors are configured to:
for the determining the positions of the at least two hand joints, determine the positions of the at least two hand joints from the image frame for each type of the first gesture, and
for the extracting the ROI, set the ROI using the positions of the at least two hand joints determined for each type of the first gesture.

17. The device of claim 15, wherein the one or more processors are configured to:
for the
determining of the rotation angle of the hand based on a regression between the positions of the at least two hand joints.

18. The device of claim 15, wherein, for the extracting the ROI, the one or more processors are configured to:
- determine a center point of the ROI and a length of each side of the ROI based on a weighted sum between the determined positions of the at least two hand joints, and
- extract the ROI based on the center point of the ROI and the length of each side of the ROI.

19. A method of operating a wearable electronic device, the method comprising:
- recognizing a first gesture of a hand of a user in an image frame corresponding to a view of a camera;
- extracting, from the image frame, a region of interest (ROI) corresponding to the first gesture;
- determining positions of at least two hand joints of a finger of the hand in the image frame;
- determining the ROI using the positions of the at least two hand joints; and
- adjusting a size of the extracted ROI and projecting the ROI of the adjusted size onto a virtual display, based on whether a second gesture of the hand is recognized, wherein the determining the positions of the at least two hand joints comprises:
- determining a rotation angle of the hand based on the positions of the at least two hand joints; and
- determining new positions of the at least two hand joints by adjusting the determined rotation angle of the hand from previous positions to the new positions, and wherein the extracting the ROI comprises extracting the ROI based on the new positions of the at least two hand joints.

20. The method of claim 19, wherein the recognizing the second gesture comprises recognizing a change in space between fingers of the user while a pose of the fingers corresponding to the first gesture is maintained.

21. The method of claim 19, wherein the extracting the ROI comprises:
- determining a weighted sum between positions of the at least two hand joints of the user in the image frame, based on a determined type of the first gesture; and
- determining a position and size of the ROI based on the weighted sum.

22. The method of claim 19, wherein the extracting the ROI comprises determining a length of the ROI to be between the positions of the at least two hand joints of the user in the image frame and a width of the ROI to be between positions of other hand joints of the user in the image frame.

* * * * *